(12) United States Patent
Donescu et al.

(10) Patent No.: US 7,031,491 B1
(45) Date of Patent: Apr. 18, 2006

(54) METHOD FOR DETERMINING A PARTITION IN ORDER TO INSERT A WATERMARK, AND ASSOCIATED INSERTION AND DECODING METHODS

(75) Inventors: Ioana Donescu, Rennes (FR); Eric Nguyen, Rennes (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/544,159

(22) Filed: Apr. 6, 2000

(30) Foreign Application Priority Data

| Apr. 9, 1999 | (FR) | ................................... 99 04461 |
| Apr. 9, 1999 | (FR) | ................................... 99 04462 |
| Jun. 25, 1999 | (FR) | ................................... 99 08187 |

(51) Int. Cl.
*G06K 9/00* (2006.01)

(52) U.S. Cl. ....................... 382/100; 713/176
(58) Field of Classification Search ............... 382/100, 382/232; 380/219, 277, 278, 279; 713/176
See application file for complete search history.

(56) References Cited

U.S. PATENT DOCUMENTS

| 5,530,759 | A | * | 6/1996 | Braudaway et al. .......... 380/54 |
| 5,915,027 | A | * | 6/1999 | Cox et al. ..................... 380/54 |
| 6,037,984 | A | * | 3/2000 | Isnardi et al. .......... 375/240.21 |
| 6,064,764 | A | * | 5/2000 | Bhaskaran et al. ......... 382/183 |
| 6,141,441 | A | * | 10/2000 | Cass et al. .................. 382/166 |
| 6,185,312 | B1 | * | 2/2001 | Nakamura et al. .......... 382/100 |
| 6,278,792 | B1 | * | 8/2001 | Cox et al. ................... 382/100 |
| 6,314,192 | B1 | * | 11/2001 | Chen et al. ................. 382/100 |
| 6,332,030 | B1 | * | 12/2001 | Manjunath et al. ......... 382/100 |
| 6,359,998 | B1 | * | 3/2002 | Cooklev ..................... 382/100 |
| 6,466,209 | B1 | * | 10/2002 | Bantum ...................... 345/589 |
| 6,553,148 | B1 | * | 4/2003 | Zeng et al. ................. 382/240 |
| 6,556,688 | B1 | * | 4/2003 | Ratnakar .................... 382/100 |

FOREIGN PATENT DOCUMENTS

EP  0 891 071  1/1999

(Continued)

OTHER PUBLICATIONS

"Embedding Visible Video Watermarks in the Compressed Domain", J. Meng, et al., International Conference on Image Processing ICIP98, vol. 1, Oct. 4-7, 1998, pp 474-477, XP002124674, New York, NY, U.S.A.

(Continued)

*Primary Examiner*—Samir Ahmed
*Assistant Examiner*—Anand Bhatnagar
(74) *Attorney, Agent, or Firm*—Fitzpatrick, Cella, Harper & Scinto

(57) ABSTRACT

A method of determining a partition into distinct regions of a set of coefficients representative of at least a part of an image in order to insert a watermark comprises the following steps:

generation (E501) of a centred pseudo-random sequence (w) equal in size to the cardinal number (N) of the said set of coefficients, formed from centred pseudo-random sub-sequences;

modulation (E502) of the said set of coefficients by the said centred pseudo-random sequence (w) in order to insert the same information bit on the said set of coefficients; and checking (E504–E508), over each region, of a criterion of detectability of the information bit inserted by modulation.

Use especially for determining an adaptative partition as a function of a criterion of detectability of an information bit inserted on each region.

46 Claims, 15 Drawing Sheets

FOREIGN PATENT DOCUMENTS

WO          98/37513          8/1998

OTHER PUBLICATIONS

"Object-Based Transparent Video Watermarking", M.D. Swanson, et al., IEEE First workshop on Multimedia Signal Processing, Jun. 23-25, 1997, pp 369-374, XP0002124675, New York, NY, U.S.A.

DCT-Based Watermark Recovering Without Resorting to the Uncorrupted Original Image, A. Piva, et al., Proceedings of the International Conference on Image Processing, US, Los Alamitos, CA: IEEE, 1997, pp 520-523, XP000668945.

"Visibility of Wavelet Quantization Noise", A. Watson, et al., NASA Ames Research Center, Moffet Field, CA, Dept. of Electrical Engineering, UCLA, Jul. 23, 1996.

"A Method for Signature Casting on Digital Images" I. Pitas, Department of Informatics, University of Thessaloniki, Greece, Proc., ICIP (International Conference in Image Processing), pps. 215-218, Sep. 1996.

"Transparent Robust Image Watermarking" M. Swanson, et al., Dept. of Electrical Engineering, University of Minnesota, MN, Proc. ICIP (International Conference in Image Processing), pps. 211-214, Lausanne, Suisse, Sep. 1996.

"Probability Summation Over Time", A. Watson, Department of Psychology, University of Pennsylvania, PA, Vision Research, 1979.

"Transform Domain Perceptual Watermarking with Scalable Visual Detection", W. Zeng, et al., Sharp Laboratories of America, JPEG 2000 Contribution, Mar. 16, 1998.

"A Statistical Watermark Detection Technique without Using Original Images for Resolving Ownerships of Digital Images", W. Zeng, et al., Digital Video Department, Sharp Laboratories of America, IEEE Proc. In Image Processing, Nov. 1999.

"Modulation and Information Hiding in Images", J. Smith, et al., Physics and Media Group, MIT Media Lab., Information Hiding, First International Workshop, pps. 207-226, Cambridge, UK Jun. 1996.

"Image-Adaptive Watermarking Using Visual Models", C. Podilchuk, et al., IEEE Journal on Selected Areas in Communications, vol. 16, No. 4, May 1, 1998, pp 525-539, XP000765113.

"Watermarking Digital Images for Copyright Protection", J.J.K. O Ruanaidh, et al., IEE Proceedings: Vision, Image and Signal Processing, vol. 143, No. 4, Aug. 1, 1996, pp 250-256, XP000613938.

"A Method of Watermarking with Multiresolution Analysis and Pseudo Noise Sequences", J. Onishi, et al., Systems & Computers in Japan, U.S., Scripta Technical Journals, New York, vol. 29, No. 5, Nov. 1997, pp 3020-3028, XP000668963.

"Digital Image Watermarking Using Visual Models", C. Podilchuk, et al., Proceedings of the SPI., vol. 3016, Feb. 10, 1997, pp 100-110, XP000199957.

"Adaptive Watermarking in the DCT Domain", B. Tao, et al., 1997 IEEE International conference on Acoustics, Speech and Signal Processing, Multidimensional signal Processing, Neural Networks Munich, Apr. 21-24, 1997, vol. 4, Apr. 21, 1997, pp 2985-2988, XP000788033, Institute of Electrical and Electronics Engineers ISBN: 0-8186-7920-D.

* cited by examiner

METHOD FOR DETERMINING A PARTITION IN ORDER TO INSERT A WATERMARK, AND ASSOCIATED INSERTION AND DECODING METHODS

BACKGROUND OF THE INVENTION

The present invention concerns a method of determining a partitioning of a digital image for inserting a watermarking signal, a method of inserting a watermark, a method of processing an image and an associated method of decoding a watermarking signal.

Correlatively, it concerns a device for determining a partitioning of a digital image for inserting a watermarking signal, a device for inserting a watermark, a device for processing an image and a device for decoding a watermarking signal.

The present invention lies in general terms in the technical field of watermarking of digital images, and more particularly still images.

Watermarking digital data makes it possible to protect these data, for example by associating copyright information with them.

In its general principe, watermarking consists of inserting an indelible watermark in digital data, which can be likened to encoding additional information in the data.

Decoding this additional information makes it possible to check the additional information which has been inserted.

This inserted watermark must consequently be both imperceptible, robust to certain distortions applied to the digital image and reliable to detect.

Conventionally, a usual technique of inserting a watermarking signal in a digital image consists of using a linear modulation model in which at least one subset of coefficients representing the digital image is modulated according to this linear model using a weighting coefficient.

By denoting as $X=\{X_i, 1 \leq i \leq N\}$ a set of the coefficients representative at least of part of a digital image, and as $w=\{w_j, 1 \leq j \leq P\}$ a watermark of size $P \leq N$, a pseudo-random signal with known distribution and average of zero, the linear insertion formula is:

$$X'_j = X_j + b\, \alpha_j w_j, \text{ with } 1 \leq j \leq P,$$

in which $\{X_j, 1 \leq j \leq P\}$ is a subset of the set of coefficients X, b is an information bit, and $\alpha_j$ is a weighting coefficient, also called modulation amplitude.

The detection of the watermark then consists in detecting whether or not the pseudo-random sequence w has been inserted into a set of coefficients. This detection is carried out without using the original image and can be based on a standardised statistical test which makes it possible to calculate a probability of correct detection.

Such an insertion technique makes it possible, by insertion of a watermark, to insert a single information bit since the response from the detector is binary (yes/no).

In order to insert a larger number of information bits into the digital image, in particular when a code of Q bits is wanted, indicating, for example, the name or the address of the owner or of the author of the image, it is necessary to reiterate the previously described insertion method as many times as there are information bits to be inserted. Typically, in order to insert a binary signal, either b=1, or b=−1 is used.

Put another way, Q subsets of coefficients have to be chosen and the modulation of these subsets has to be carried out by choosing Q watermarks.

Separate subsets of coefficients are preferably chosen such that the modulation operations are not superimposed on one another, which could disturb the detection or cause troublesome visual effects.

It is a matter, consequently, of choosing a partition of the coefficients representative of the digital image into Q separate subsets, each carrying one information bit.

Numerous known methods use a technique of inserting a watermarking signal of given size by spectrum spreading. The disadvantage of these methods, describe for example in the article entitled "Secure spread spectrum watermarking for multimedia" by I. J. COX et al, in Proc. ICIP, pages 243–246, September 1996 and in the article entitled "Digital watermarking of raw and compressed video" by F. HARTUNG et al, in Proc. SPIE 2952: Digital Compression Technologies and Systems for Video Communication, pages 205–213, October 1996, is that they use an arbitrary partitioning of the image into blocks of fixed size without any guarantee of detectability of the modulations effected on each of the blocks.

SUMMARY OF THE INVENTION

The aim of the present invention is to propose a method of determining a partitioning of a digital image which is adapted to the image, ensuring detectability of the bits inserted for a technique of insertion by modulation.

The present invention thus relates to a method of determining a partitioning into distinct regions of a digital image in order to insert a watermarking signal by modulation of coefficients of said regions representing a digital image.

In accordance with the invention, this partitioning into regions is effected by an adaptive partitioning as a function of a criterion of detectability of an information bit inserted in each region.

In this way an adaptive partitioning is performed which has the advantage of adapting to the content of the image signal and guaranteeing detectability of the inserted watermarking signal, unlike the choice of an arbitrary partitioning into fixed blocks.

This spatial adaptivity is necessary so as the content of the image is not spatially homogenous.

This is because, for a given modulation amplitude, the greater the length of the sequence of the watermarking signal inserted, and consequently the greater the size of the region and therefore the number of modulatable coefficients, the more reliable is the detection.

It can in fact be shown that, when a correlation calculation is used for effecting the detection, the response of the detector is proportional to $p^{1/2}$ where P is the length of the sequence of the watermarking signal.

Moreover, the response of the detector is also dependent on the image signal itself. The greater the variance in the coefficients representing the image, the weaker the response of the detector.

In conclusion, for a given modulation amplitude and image, there exists a minimum length of the watermarking signal necessary for ensuring a given detection probability, this minimum length also depending on the local content of the image signal in the region in which the watermarking signal is inserted.

The adaptive partitioning effected by the method according to the invention guarantees the detectability of the watermarking signal inserted in the different regions determined by this partitioning.

Preferably, the detectability criterion is calculated using a maximum value of the weighting coefficient ensuring imperceptibility of the watermarking signal for the modulation of the set of coefficients representing said digital image.

This is because, the greater the modulation amplitude, that is to say the value of the weighting coefficient, the more reliable is the detection in that a better probability of detection can be obtained. Nevertheless, the greater this modulation amplitude, the more this modulation may be visible in the watermarked image.

It is therefore judicious to choose a modulation amplitude equal to a maximum amplitude, generally denoted JND (Just Noticeable Difference), beyond which the modulation becomes visibly perceptible in the image.

It can be shown that this maximum amplitude also depends on the length of the sequence of the watermarking signal and that it decreases with this length.

By choosing a maximum value of the weighting coefficient ensuring imperceptibility of the watermarking signal for the modulation of the set of coefficients representing said digital image, the value of the weighting coefficient on each region of the partitioning, and with a size less than the cardinal number of all the coefficients representing the image, will be much less than the maximum modulation amplitude which guarantees imperceptibility of the modulation on this region.

The partitioning thus performed also ensures invisibility of the modulation effected on each of the regions obtained by the partitioning.

According to an advantageous characteristic of the invention, the detectability criterion is calculated using, for each coefficient to be modulated, a weighting coefficient according to a law of the form $\alpha_i = k_i \cdot \alpha_v$, where $k_i$ is a modulation factor dependent on the coefficients situated in a vicinity of the coefficient considered on said region and $\alpha_v$ is equal to said maximum value of the weighting coefficient.

It is thus possible to exploit the possibilities of visual "masking" of the modulation by the image signal itself. Typically, use is made of the fact that, the greater the activity of the image signal, in the sense for example of a significant local variance in the coefficients, the less visible will be the modulation.

It is thus possible to locally increase the weighting coefficient and therefore the modulation amplitude, to the benefit of detectability, without impairing the imperceptibility of the inserted modulation.

According to another preferred characteristic of the invention, the method of determining a partitioning includes a step of applying a distortion before calculating the detectability criterion.

According to another preferred characteristic of the invention, the method of determining a partitioning includes a prior step of comparing the size of each region of the partitioning with a minimum size corresponding to the minimum size of a statistically significant sample for detecting a watermarking signal inserted in said region.

Indeed, because of the calculations of a statistical nature performed when the watermarking signal is detected, notably when standardised hypothesis tests are used, it is necessary to consider a minimum boundary for the size of each region of the partitioning guaranteeing the validity of the detection tests.

According to one particularly practical embodiment of the invention, for each region of the partitioning, all the coefficients of said region are modulated by inserting the watermarking signal, a detectability amplitude is calculated from said detectability criterion and said detectability criterion is validated by comparing said detectability amplitude with a predetermined threshold value.

The detectability amplitude can be the result of a calculation of correlation between the set of modulated coefficients and the watermarking signal or the result of a standardised statistical test such as the one described in the article entitled "A method for signature casting on digital images" by I. PITAS, in Proc. ICIP, pages 215–218, September 1996.

Practically, the detectability criterion can be validated if a minimum modulation length calculated for ensuring detectability of the inserted watermarking signal in less than or equal to the cardinal number of said region.

According to a preferred embodiment of the invention, the method comprises the following steps:

generation of a centred pseudo-random sequence equal in size to the cardinal number of a set of coefficients representative of at least a part of the image, formed from centred pseudo-random sub-sequences;

modulation of the said set of coefficients by the said centred pseudo-random sequence in order to insert the same information bit on the said set of coefficients; and checking, over each region, of a criterion of detectability of the information bit inserted by modulation.

It is thus possible to achieve a partition of a set of coefficients into distinct regions, by carrying out an adaptive partitioning on the basis of a criterion of detectability of an information bit inserted on each region.

Such an adaptive partitioning exhibits the advantage of adapting to the content of the image signal and of guaranteeing the detectability of the watermark inserted on the different regions determined by this partition, in contrast to the choice of a random partitioning.

In practice, for each region of the partition, a criterion of detectability of an information bit inserted by modulation of the coefficients of the said region is checked. This criterion may consist in the comparison of a result of a standardised statistical test with a threshold value corresponding to a probability of detection fixed in advance.

By virtue of the method in accordance with the invention, it is possible to generate a centred pseudo-random sequence on the basis of the merging of centred pseudo-random sequences of smaller sizes, and to modulate all the available coefficients in order to achieve the insertion of a watermark.

By modulating all the coefficients with the same information bit and a centred pseudo-random sequence which is broken down into pseudo-random sub-sequences which are also centred on each region of the partition produced over the set of coefficients, the steps of generating a pseudo-random sequence and of modulation do not have to be reiterated at each new region tested.

According to one preferred characteristic of the invention, the method of determining a partition comprises a single step of applying a distortion to the said set of modulated coefficients, before the step of checking of a detectability criterion.

It is known to apply a predetermined distortion to a set of modulated coefficients and to carry out the check on the detectability criterion after this pre-distortion, in such a way that it is possible to guarantee the detection of the watermark inserted on a partition of the coefficients for a predetermined distortion.

By virtue of the invention, a pre-distortion can be applied to the set of modulated coefficients, in a unique way, and does not need to be reiterated at each new region tested in the partition.

In one particularly practical embodiment of the invention, the set of coefficients is a set of spectral coefficients originating from a spectral transformation of a digital image, and the step of applying a distortion includes the following sub-steps:

inverse spectral transformation of the said set of modulated coefficients in order to obtain a watermarked image;

application of a distortion to the said watermarked image; and spectral transformation of the watermarked image in order to obtain a set of modulated coefficients after distortion.

The saving obtained in terms of complexity of calculation is all greater in this case whenever the application of a distortion requires several steps of processing of the set of coefficients, and particularly the application of an inverse spectral transformation in order to obtain the watermarked image and to apply a distortion, such as compression/decompression to it, and then the application of a forward spectral transformation of the image again so as to check the criterion of detectability in the spectral domain.

According to another particularly practical characteristic of the invention, the centred pseudo-random sequence is formed from pseudo-random sub-sequences of identical size.

Such a pseudo-random sequence is particularly well adapted to the application of a bottom-up or top-down iterative partitioning of the quadtree type which makes it possible iteratively to combine regions of identical sizes or iteratively to divide regions into sub-regions of identical sizes.

For preference, the pseudo-random sub-sequences have a size greater than or equal to a minimum number of coefficients forming a region of the said partition of a size which is statistically significant for validating the said criterion of detectability over the said region.

It is thus possible theoretically to form a maximum partition of the set of coefficients with the same unique centred pseudo-random sequence, each pseudo-random sub-sequence being centred on the regions with the smallest size which is statistically admissible for inserting a watermark by modulation into the set of coefficients.

According to one practical embodiment, which is inexpensive in terms of calculations, at the generation step, each centred pseudo-random sub-sequence is created by generating half of the pseudo-random samples of the said sub-sequence via a pseudo-random number generator and by symmetrising the said pseudo-random samples generated.

For preference, in this embodiment, at the generation step, each centred pseudo-random sub-sequence is created by moreover permutating the said pseudo-random samples using a secret key.

This permutation operation makes it possible better to preserve the intrinsic random-sequence nature of a sub-sequence created by symmetrising pseudo-random samples, and not to diminish the imperceptibility of the inserted watermark.

According to another practical embodiment of the invention, at the generation step, each centred pseudo-random sub-sequence is created by generating pseudo-random random samples via a pseudo-random number generator and by redistributing over each sample the sum of the said pseudo-random samples generated.

According to a preferred characteristic of the invention, a partitioning by iterative division of the digital image is performed and, for each region at a rank of said partitioning, a partitioning of a directly higher rank of said region is validated if and only if there exist at least two subregions of said region for which said detectability criterion is validated.

Thus, when it is attempted to divide a region into subregions, this partitioning of a higher rank is validated only if the number of regions in which a watermarking signal can actually be inserted whilst complying with the detectability criterion is actually increased.

Otherwise, it is preferable to keep the region before division, of greater size, in order to increase the detectability of the watermarking signal.

According to a preferred embodiment of the invention, for each region at a rank of said partitioning, the value of a capacity of the digital image is incremented when the partitioning of directly higher rank is not validated, the said capacity being equal to the cardinal number of the distinct regions obtained by the said partitioning on which the detectability criterion is validated.

It is thus possible to calculate the capacity of the digital image which thus corresponds to the number of information bits which can be inserted in the digital image.

By virtue of the adaptive partitioning performed by the invention, by reiterating the partitioning of each region as long as the detectability criterion is complied with, there is obtained the maximum capacity of the digital image which corresponds to the watermarking capacity of this image by the technique of insertion by modulation. This watermarking capacity can be defined as the maximum number of information bits which can be inserted imperceptibly in the image with a guarantee of detectability on decoding.

According to another embodiment of the invention, for each region at a rank of said partitioning, the value of a capacity is incremented when the partitioning of directly higher rank is not validated, said value of the capacity is compared with a fixed capacity value and the partitioning is reiterated for a region having a detectability amplitude which is the highest amongst all the other regions to be processed when said capacity value is less than said fixed capacity value.

This partitioning method makes it possible, in this embodiment, to find the best possible partitioning in terms of detectability when a predetermined number of information bits have to be inserted, equal to said fixed capacity value.

By selecting, during the partitioning, the regions for which the detection amplitude is the highest, the present invention makes it possible to determine the partitioning which, a priori, guarantees the best detectability on decoding of the watermarking signals making it possible to insert a predetermined number of information bits.

According to another embodiment of the invention, a partitioning is effected by iterative merging of the digital image and, for each region of said partitioning for which said detectability criterion is not validated, said region is merged with another region of said partitioning.

Preferably, in this embodiment, said other region of the partitioning is if possible a region for which said detectability criterion is not validated.

It is thus possible to increase the capacity of the digital image by joining the regions in which the detectability criterion is not satisfied.

According to another aspect of the invention, a method of inserting, into a digital image, a watermark comprising one or more information bits, comprises a method of determining a partition in accordance with the first aspect of the invention, and a step of inserting the information bit or bits by modulation of the coefficients of one or more regions of the said partition.

This insertion method exhibits advantages similar to those of the method of determining a partition which it implements, and in particular makes it possible to insert a watermark in an adaptive and reliable way as regards its detection.

The present invention also concerns a method of decoding a watermarking signal in a digital image, inserted by modulation of coefficients representing said image in distinct regions forming a partitioning of said digital image.

In accordance with the invention, this decoding method includes a step of determining a partitioning into distinct regions of the digital image to be decoded by effecting an adaptive partitioning as a function of a criterion of detectability of an information bit obtained by demodulation of the coefficients on each region.

Thus this decoding method makes it possible to find, at the decoder, the adaptive partitioning performed for inserting a watermarking signal.

This is because, when the partitioning has been-performed in an adaptive fashion as described above by a method of determining a partitioning in accordance with the first aspect of the invention, this partitioning, which depends on the content of the image, is not known to the decoder.

The decoding method according to the invention then consists of testing all the acceptable partitionings and verifying the detection of a watermarking signal on each of the regions associated with this partitioning.

According to a preferred characteristic of the invention, the decoding method includes a prior step of comparing the size of each region of the partitioning with a minimum size corresponding to the minimum size of a statistically significant sample for the detection of a watermarking signal inserted in said region.

According to a practical embodiment of the decoding method according to the invention, for each region of the partitioning, a detection amplitude is calculated from said detectability criterion and said detectability criterion is validated by comparing said detection amplitude with a threshold value predetermined for decoding.

The decoding method thus makes it possible to find the adaptive partitioning effected when the watermarking signal is inserted.

According to advantageous characteristic of this embodiment in the invention, the threshold value predetermined for decoding is less than said predetermined threshold value used during the method of determining a partitioning.

This is because, at decoding, the detection test is performed on coefficients which have a priori been modulated and possibly made noisy. These coefficients are different from the original coefficients, and the result of the detectability test at decoding will be different from that performed in order to determine the partitioning. By choosing different thresholds on decoding and coding, it is possible to take into account the tendency for variation in detection amplitude due to an increased variance in the coefficients which have been modulated and possibly made noisy.

Correlatively, the present invention also concerns a device for determining a partitioning into distinct regions of a digital image for inserting a watermarking signal by modulating coefficients of said regions, comprising partitioning means adapted to effect an adaptative partitioning as a function of a criterion of detectability of an information bit inserted on each region.

According to a preferred embodiment, this device for determining a partition includes:

means for generating a centred pseudo-random sequence equal in size to the cardinal number of the said set of coefficients, formed by centred pseudo-random sub-sequences;

means for modulation of a set of coefficients by the said centred pseudo-random sequence in order to insert the same information bit on the said set of coefficients; and means for checking, over each region, a criterion of detectability of the information bit inserted by modulation.

The present invention also envisages a device for inserting into a digital image a watermark comprising one or more information bits, comprising a device for determining a partition in accordance with the invention, and means for inserting the information bit or bits by modulation of the coefficients of one or more regions of the said partition.

Correlatively, the present invention also concerns a decoding device adapted to implement the decoding method according to the invention.

The present invention also concerns a method of processing an image, comprising the following steps:

inputting an image;

inserting a first watermarking information into said inputted image;

applying a distortion to the image obtained in said insertion step;

detecting said first watermarking information from the image obtained in said distortion applying step; and determining an amount of a second watermarking information which can be inserted into said inputted image in accordance with the result of the detection obtained in said detection step.

It further comprises the step of displaying the amount of the watermarking information determined in said determining step.

Correlatively, the present invention also concerns an image processing apparatus, comprising:

means for inputting an image;

means for inserting a first watermarking information into said inputted image;

means for applying a distortion to the image obtained by said insertion means;

means for detecting said first watermarking information from the image obtained by said distortion applying means; and means for determining an amount of a second watermarking information which can be inserted into said inputted image in accordance with the result of the detection obtained by said detection means.

This apparatus further comprises the means for displaying the amount of the watermarking information determined by said determining means.

The present invention also concerns a method of inserting a watermarking signal which can take into account at the same time predetermined imperceptibility and detectability constraints in order to ensure invisibility of the watermarking signal in the image and correct detection at the time of decoding.

In the article entitled "A method for signature casting on digital images" by I. PITAS, in Proc. ICIP, pages 215–218, September 1996, there is described a method of inserting a watermarking signal in a digital image in which the weighting coefficient $\alpha$ is determined so as to ensure detectability of the signal with a fixed probability.

This weighting coefficient must be greater than a minimum value, which can be referred to as the detection amplitude, so as to allow the detection of the inserted signal with the correct detection probability level.

This minimum value or detection amplitude depends notably on the length of the watermarking-signal and on the required detection probability level.

However, the weighting coefficient is fixed in the aforementioned document without taking into account the concept of psychovisual amplitude which guarantees invisibility of the watermarking signal inserted in the digital image.

To this end the present invention relates to a method of inserting a watermarking signal in a set of coefficients representing a digital image, in which at least one subset of coefficients is modulated according to a linear model using a weighting coefficient, the weighting coefficient being greater than a minimum value determined as a function notably of the length of the watermarking signal and a detection probability level.

According to the invention, this insertion method includes a step of calculating a maximum value of the weighting coefficient according to the length of the watermarking signal ensuring imperceptibility of the watermarking signal.

Calculating a maximum value for the weighting coefficient, which can be referred to as visual amplitude, makes it possible to take into account, when a watermarking signal is inserted in a set of coefficients representing a digital image, constraints related to the imperceptibility of the inserted watermarking signal.

Such an insertion method makes it possible to determine the conditions which make possible the insertion of a watermarking signal in an image whilst meeting predetermined imperceptibility and detectability criterion or on the other hand to decide if, under certain conditions, the insertion of the watermarking signal meets the predetermined imperceptibility and detectability criterion.

According to a practical characteristic of implementation of the present invention, the insertion method also includes a step of determining compatible values of the length of the watermarking signal, of the weighting coefficient and of the probability level so that the value of the weighting coefficient determined is less than or equal to said maximum value and greater than or equal to said minimum value for said determined values of the length of the watermarking signal and of the detection probability level.

By satisfying the aforementioned inequality for the weighting coefficient, the conditions of detectability and imperceptibility are satisfied at the same time.

It is thus possible to determine, in a correlated fashion, the value of the weighting coefficient, of the length of the watermarking signal and of the detection probability level in order to satisfy this inequality.

According to a preferred characteristic of the invention, during the step of calculating the said maximum value, a function independent of said set of coefficients to be watermarked is used.

Thus the model used for calculating the maximum value or the visual amplitude is independent of the image to be watermarked.

In a preferred embodiment of the invention, the coefficients are spatio-frequency coefficients obtained by spatio-frequency transformation of this image, the calculation of said maximum value of the weighting coefficient depending on the type of transformation used.

It is normal, before the insertion proper of a watermarking signal to apply a spatio-frequency transformation to the image, also referred to as transformation into sub-bands of the image, of the discrete cosine transformation (DCT) or wavelet transformation type, so that the modulation for inserting the watermarking signal is implemented on spatio-frequency coefficients of a sub-band of the image.

The insertion method according to the invention applies particularly well to the conventional techniques of insertion by modulation inserted in a transformed domain obtained by one of the aforementioned spatio-frequency transformations.

In practice, said calculation function used for calculating the maximum value or visual amplitude $\alpha_V$ as a function of the length P of the watermarking signal w is of the type:

$$\alpha_V(P, S, w) = \frac{\alpha_{base}(S)}{P^{1/\beta}(E[|w|^\beta])^{1/\beta}}$$

where $\alpha_{base}(S)$ is a base value, dependent on the transformation used S and on the (base) sub-band considered for the insertion, of the maximum weighting coefficient ensuring imperceptibility when a single coefficient of said sub-band is modulated, $\beta$ is strictly greater than 2, and $E[|w|^\beta]$ is the mathematical expectation of the function $|w|^\beta$.

According to another preferred characteristic of the invention, said minimum value is determined by using a calculation function also depending on the variance of the coefficients to be modulated, on the distribution of the watermarking signal and possibly on the variance of an additive noise decorrelated from the coefficients modelling any distortions applied to coefficients.

Thus the minimum value of the weighting coefficient or detection amplitude can be calculated by taking into account notably the distortions which the image may undergo, notably during normal processings consisting of compression of digital images, in so far as such distortions can be modelled in the form of an additive noise decorrelated from the coefficients representing the image.

In practice, the said function of calculating the detection amplitude $\alpha_D$ as a function of the length P of the watermarking signal w is of the type $$\alpha_D(P) = \frac{a\left(\sqrt{\sigma_X^2 + \sigma_n^2}\right)}{\sqrt{bP - c}}$$

where $\sigma_x^2$ is equal to the variance of the coefficients to be modulated, $\sigma_n^2$ is equal to the variance of the additive noise and a, b and c are constants which depend on the distribution of the watermarking signal and on the required detection probability level.

According to a preferred characteristic of the invention, the watermarking signal is a pseudo-random sequence with a predetermined distribution with a zero mean.

The use of such a watermarking signal increases the robustness of the inserted watermarking signal with respect to an intentional attack aimed at extracting or modifying the watermarking signal, typically by statistical analysis, the kernel of the pseudo-random sequence produced from a predetermined distribution also being able to be given by a secret key.

In a particularly advantageous embodiment of the invention, the method of inserting a watermarking signal includes the following steps:

calculating a maximum value of the weighting coefficients for a length of the watermarking signal equal to the cardinal number of the set of modulatable coefficients ensuring imperceptibility of the watermarking signal at the limit of perceptibility;

calculating the length of the watermarking signal for a minimal value of the weighting coefficient equal to said maximum value calculated and for a predetermined detection probability level; and comparing said calculated length with the cardinal number of the set of modulatable coefficients.

Thus, by determining the maximum value of the weighting coefficient at the limit of perceptibility, that is to say in the eventuality of all the coefficients available being modulated, it is possible to determine the minimum length of the watermarking signal which makes it possible to obtain a correct detection probability with a weighting coefficient equal to the maximum value calculated.

The comparison of this length thus calculated with the cardinal number of all coefficients available in order to effect the insertion makes it possible to determine whether this insertion is actually possible with the required detection probability level.

In addition, if the calculated length is less than the cardinal number of the set of coefficients, it can be certain that the imperceptibility criterion will indeed be met by modulating a subset of coefficients with a cardinal number equal to this calculated length, since the value of the weighting coefficient was calculated in the eventuality of all the available coefficients actually being modulated.

In practical terms, if, at said comparison step, said calculated length is less than or equal to the cardinal number of the set of modulatable coefficients, a watermarking signal with a length at least equal to said calculated length is inserted by modulating a subset of coefficients with a cardinal number equal to said length, according to a linear model using a weighting coefficient equal to said calculated maximum value.

Conversely, if at said comparison step said calculated length is greater than the cardinal number of the set of modulatable coefficients, there is calculated the detection probability level obtained for a minimum value of the weighting coefficient equal to said maximum value calculated for a watermarking signal length equal to the cardinal number of all the modulatable coefficients.

Thus the decision to insert a watermarking signal or not on the set of modulatable coefficients can be taken in the theoretical knowledge of the detection probability level obtained by default.

In another practical embodiment of the invention, the insertion method includes a step of calculating a threshold value of the length of the watermarking signal determined so that said minimum value of the weighting coefficients is equal to said maximum value of the weighting coefficients for a length of the watermarking signal equal to said threshold value and a predetermined detection probability level.

It is thus possible to determine the minimum length threshold which the watermarking signal must meet in order to simultaneously meet the two criteria of perceptibility and detection when the watermarking signal is inserted in a digital image.

Correlatively, the present invention also concerns a device for inserting a watermarking signal in a set of coefficients representing a digital image, in which at least one subset of coefficients is modulated according to a linear model using a weighting coefficient, the weighting coefficient being greater than a minimum value determined as a function notably of the length of the watermarking signal and of a detection probability level.

This insertion device comprises means of calculating a maximum value of the weighting coefficient as a function of the length of the watermarking signal ensuring imperceptibility of the watermarking signal.

This insertion device has characteristics and advantages similar to those described previously since it is adapted to implement the insertion method according to the invention.

The present invention also concerns a computer, a digital image processing apparatus, a digital printer, a digital photographic apparatus and a digital camera adapted to implement the method of determining a partitioning, the methods of inserting a watermark, the method of processing an image and the decoding method in accordance with the invention.

These devices for determining a partitioning, inserting a watermark, processing an image and decoding, this computer, this digital image processing apparatus, this digital printer, this digital photographic apparatus and this digital camera have characteristics and advantages similar to those described with reference to the methods which they implement.

The present invention also relates to a computer program product and to an information storage means which can be read by a computer or a microprocessor, possibly removable, which stores a program implementing the method of determining a partitioning and/or inserting a watermark and/or processing an image and/or decoding in accordance with the invention.

Other particularities and advantages of the invention will also emerge from the following description of the invention.

BRIEF DESCRIPTION OF THE DRAWINGS

In the accompanying drawings, given by way of non-limitative examples.

DETAILED DESCRIPTION OF THE PREFERRED EMBODIMENTS

Figure 1:
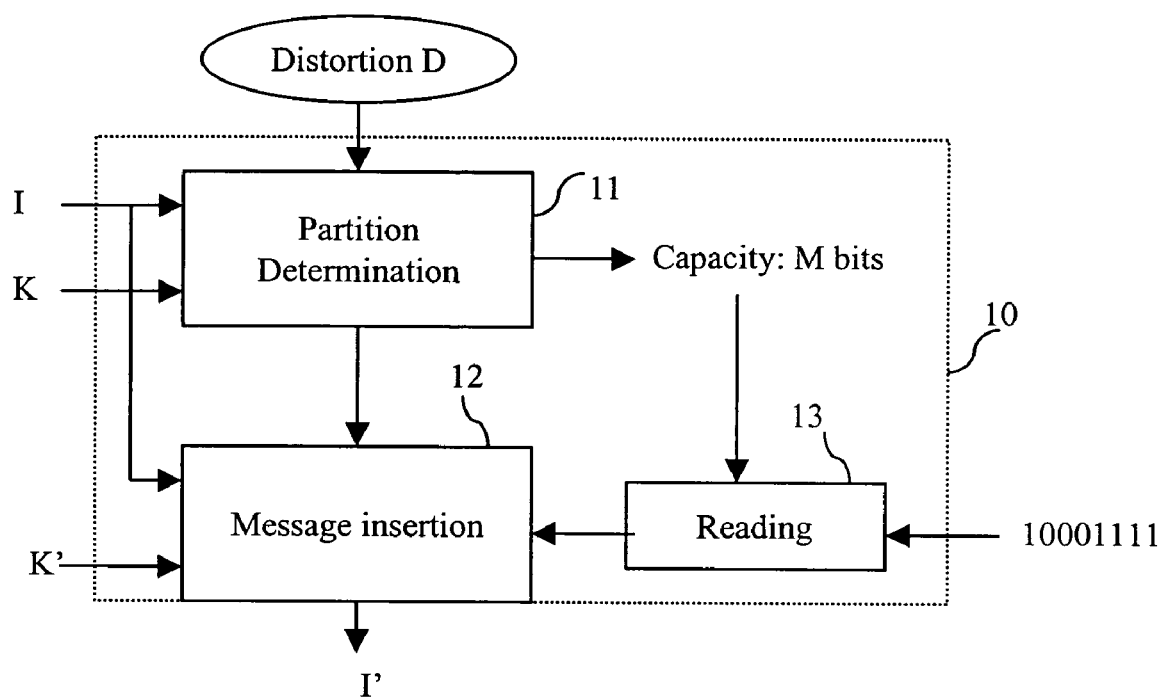
FIG. 1 is an overall diagram illustrating a device for inserting a watermark into a digital image.

A description will first of all be given, by reference to FIG. 1, of the insertion of a watermark into a set of coefficients representative of a digital image I.

This digital image I can be represented by a set of coefficients, either in the spatial domain or in a transformed domain, the coefficients in this latter case being hybrid coefficients, that is to say coefficients located both in the spatial domain and in the frequency domain. Such a representation of the image is obtained, for example, by using a sub-band originating from a space-frequency decomposition of the image, for example a discrete wavelet decomposition.

Here, the insertion of the watermark is achieved via a spread-spectrum insertion technique, by modulation of coefficients of a space-frequency representation of the image, obtained by the space-frequency transformation of the digital image I.

Figure 2:
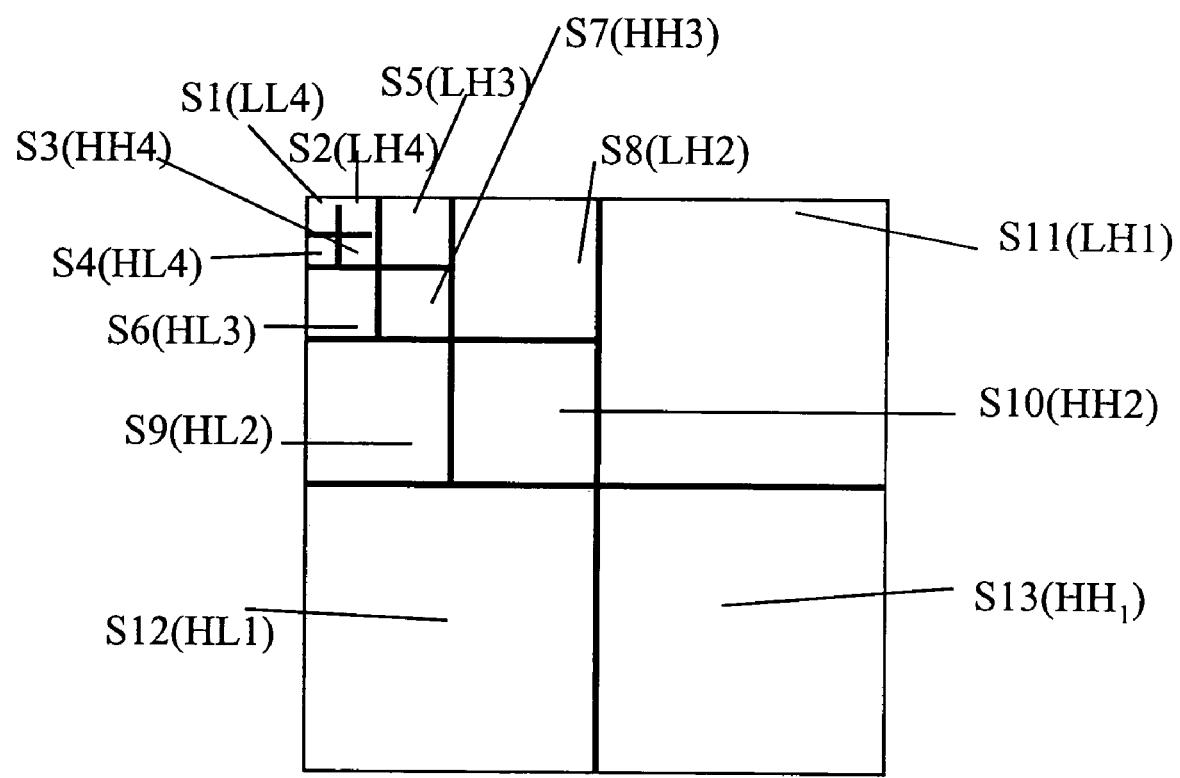
FIG. 2 schematically illustrates a step of spectral decomposition employed when inserting a watermark.

By way of example, a discrete wavelet decomposition S can be used, represented diagrammatically in FIG. 2. This space-frequency decomposition is well known in the image-processing field, and only the principle thereof is reiterated below. It makes it possible to segment the image into sub-bands of frequencies and to obtain hybrid coefficients, that is to say spectral coefficients which are also located in space, here in the plane of the image.

The image I consists of a series of digital samples. The image I is represented, for example, by a series of bytes, each byte value representing one pixel of the image I, which may be a black-and-white image with 256 grey levels.

The multi-resolution spectral decomposition means consist of a sub-band decomposition circuit, or analysis circuit, formed by a set of analysis filters, associated respectively with dividers-by-two. This decomposition circuit filters the image signal I in two directions, into sub bands of high spatial frequencies and of low frequencies. The circuit includes several successive analysis blocks for breaking down the image I into sub-bands according to several levels of resolution.

By way of example, the image I is broken down here into sub-bands with a level of decomposition d equal to 3.

A first analysis block receives the image signal I and filters it through two respectively low-pass and high-pass digital filters, in a first direction, for example horizontal. After passing through dividers-by-two, the resultant filtered signals are in their turn filtered by two respectively low-pass and high-pass filters, in a second direction, for example vertical. Each signal is again passed through a divider-by-two. Hence four sub-bands $LL_1$, $LH_1$, $HL_1$ and $HH_1$ are obtained at the output of this first analysis block, with the highest resolution in the decomposition.

The sub-band $LL_1$ includes the low-frequency components in the two directions of the image signal I. The sub-band $LH_1$ includes the low-frequency components along a first direction and high-frequency components along a second direction of the image signal I. The sub-band $HL_1$ includes the high-frequency components along the first direction and the low-frequency components along the second direction. Finally, the sub-band $HH_1$ includes the high-frequency components along the two directions.

A second analysis block in its turn filters the sub-band of low frequencies $LL_1$ so as, in the same way, to supply four sub-bands $LL_2$, $LH_2$, $HL_2$ and $HH_2$ with intermediate level of resolution in the decomposition. A third analysis block then filters the sub-band of low frequencies $LL_2$ so as to supply four sub-bands $LL_3$, $LH_3$, $HL_3$ and $HH_3$. Finally in this example, the sub-band $LL_3$ is in its turn analysed by a fourth analysis unit in order to supply four sub-bands $LL_4$, $LH_4$, $HL_4$ and $HH_4$ with the lowest resolution in this decomposition.

Hence thirteen sub-bands and four levels of resolution are obtained. Obviously, the number of levels of resolution, and consequently of sub-bands, may be chosen differently.

Obviously, other types of spectral transformation could be used, such as the discrete Fourier transform, the discrete cosine transform or the Fourier-Mellin transform.

In a general way, frequency sub-bands are obtained forming a set of spectral coefficients into which a watermark can be inserted.

The high-frequency sub-band of highest resolution $HH_1$ can be considered here in order to insert a watermark. This sub-band $HH_1$ thus supplies a set of coefficients X, equal to N in size, for example.

Let $X=\{X_i, 1 \leq i \leq N\}$ be the set of coefficients representative of the digital image I.

Obviously, it would be possible to consider a subset of coefficients of this set X, representative only of a part of the digital image I.

In order to insert a watermark into this set of coefficients X, one-technique consists in inserting a pseudo-random signal, by spreading its spectrum, so as to render this signal undetectable by spectral or statistical analysis.

Let $w=\{w_j, 1 \leq j \leq P\}$ be a watermark of size $P \leq N$, a pseudo-random signal with known distribution and average of zero. The most widespread distributions are the binary distribution $\{-1, 1\}$, the uniform distribution over $[-1, 1]$ and a centred normalised Gaussian distribution N (0, 1).

The linear insertion formula is $$X'_j = X_j + b\, \alpha_j\, w_j, \text{ with } 1 \leq j \leq P,$$

in which $\{X_j, 1 \leq j \leq P\}$ is a subset of the set of coefficients X, b is an information bit, and $\alpha_j$ is a weighting coefficient, also called modulation amplitude.

The set $\{j, 1 \leq j \leq P\}$ is also called information-bit insertion carrier.

In order to insert a signal which may be formed from several information bits, it is worth partitioning the set of coefficients so as to determine the number of regions or the number of insertion carriers available in this set.

To do that, the insertion device 10 in accordance with the invention comprises a device for determining a partition 11 and insertion means 12.

The device for determining a partition 11 is suitable for carrying out adaptive partitioning of the set of coefficients as a function of the detectability of an inserted watermark.

This method of adaptive partitioning consists in varying the number of coefficients modulated in order to insert an information bit of the watermark, so as simultaneously to satisfy the criteria which are set of invisibility and of correct detection probability.

Figure 3:
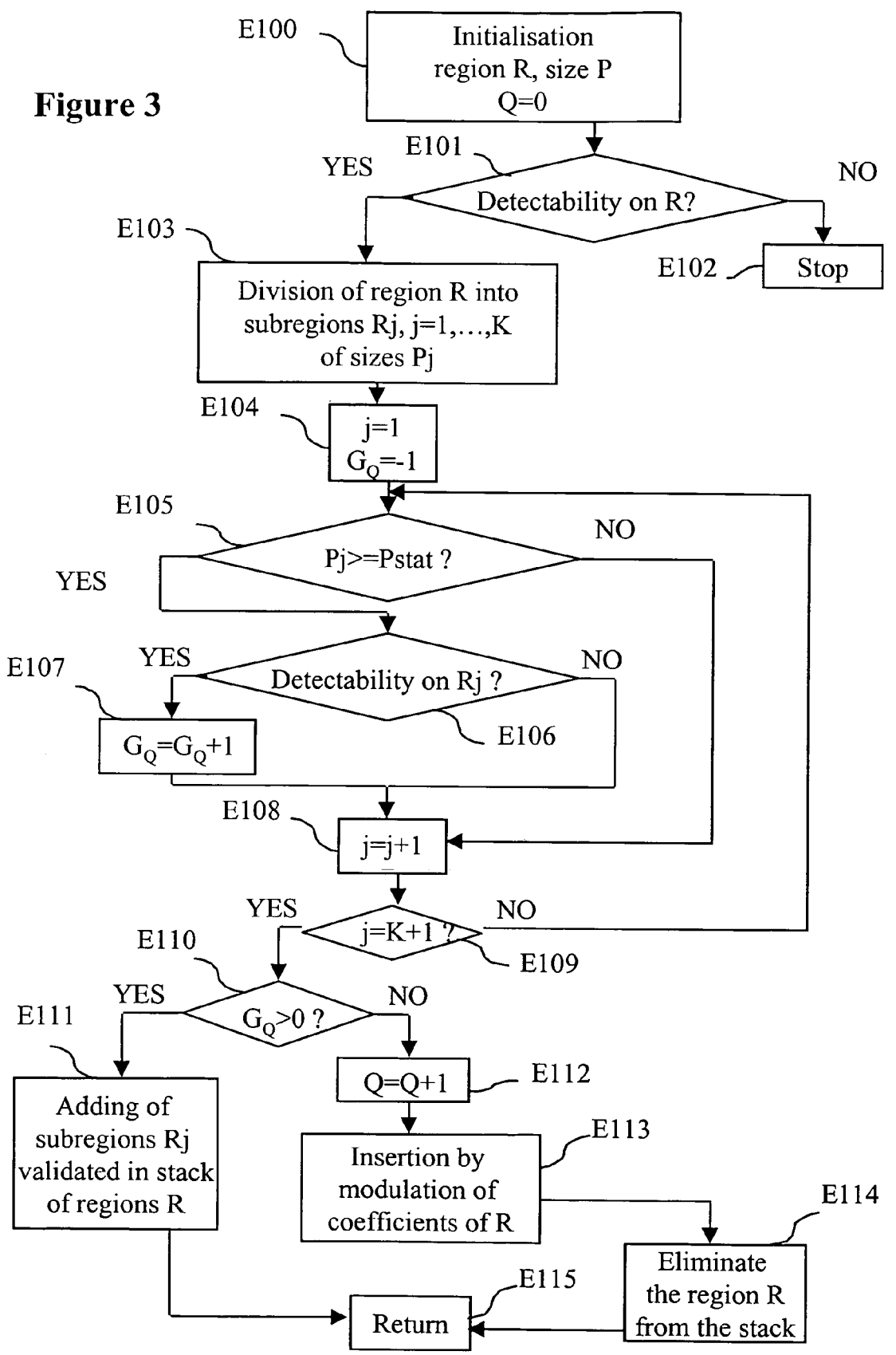
FIG. 3 is an algorithm of the method of determining a partitioning in accordance with a first embodiment of the invention.

A description will first of all be given, with reference to FIG. 3, of a method of determining a partitioning into distinct regions of a digital image which makes it possible to maximise the number of regions obtained in order to maximise the number of information bits inserted in the image.

Consideration is given to a representation of the digital image by a set of coefficients, either in the spatial domain, or in a transformed domain, the coefficients being in the latter case hybrid, that is to say located both in the spatial domain and in the frequency domain. Such a representation of the image is for example obtained by using a sub-band issuing from a spatio-frequency decomposition of the image, as a discrete wavelet decomposition previously described.

The partitioning of the image is effected in order to insert a watermarking signal by modulation of the coefficients of each region.

According to the invention, this partitioning into regions is performed by an adaptive partitioning as a function of a criterion of detectability of an information bit inserted on this region.

The number of regions obtained under constraint of the detectability criterion makes it possible to define a maximum capacity of the digital image. This maximum capacity corresponds to the number of information bits which it is possible to insert in the digital image whilst complying with the detectability criterion.

Initially, at a step E100, this capacity Q is initialised to 0 and the starting point is an initial partitioning which is limited here to a single region R of size P.

Naturally, the initial partitioning could be different and notably include already several distinct regions with sizes which might be different.

It is assumed that the size P of this initial region R is greater than a minimum size denoted $P_{stat}$ which corresponds to the minimum size of a statistically significant sample of coefficients for detecting a watermarking signal inserted in these coefficients. Typically, this minimum size can be fixed at 100.

This initial region R can consist of the set of coefficients of the representation under consideration or a subset of this representation.

A test step E101 then tests the detectability of the insertion of a watermarking signal in the initial region R.

This detectability test can be effected by actual modulation and detection operations on the coefficients of the initial region R.

In practice, all the coefficients of the initial region R are copied into a working memory so as not to directly watermark the image.

Next all the coefficients of the initial region R are modulated by inserting the watermarking signal.

Conventionally, the following procedure is followed in order to effect this modulation:

The initial region R consists of a set of coefficients:
X: $\{X_i, i=1, \ldots P\}$ Normally a linear modulation is used of the type:

$X_i^* = X_i \pm \alpha_i W_i$, with $i=1, \ldots, P$ where W: $\{W_i, i=1 \ldots, P\}$ is the watermarking signal generally chosen as a pseudo-random sequence with a known distribution and a nil mean.

The value of the sign ± of the modulation depends on the binary value to be inserted: for example the sign − corresponds to the value 0 and the sign + corresponds to the value 1.

It is possible to choose, by way of example, a pseudo-random sequence W which follows a uniform law on the interval [−1, 1].

Naturally, any pseudo-random watermarking with known distribution and nil mean can be suitable. The most usual distributions for the watermarking signal W are, apart from the aforementioned uniform distribution [−1, 1], the binary distribution {−1,1} and the centred standardised Gaussian distribution N(0, 1).

The modulation can optionally be protected by means of a secret key characterising for example the kernel for reproducing the pseudo-random sequence W.

The term $\alpha_i$ is the modulation amplitude, or weighting coefficient, applied to the coefficient $X_i$.

A constant weighting coefficient can be used for all the coefficients of the region R, such that $\alpha_i = \alpha_v$ for any i, the value of the weighting coefficients $\alpha_v$ being equal to a maximum value ensuring imperceptibility of the watermarking signal for the modulation of the set of coefficients representing said digital image.

This maximum value $\alpha_v$ (referred to as Just Noticeable Difference or JND amplitude) decreases in fact with the length of the sequence of the watermarking signal W, and consequently with the number of modulatable coefficients.

Given that the capacity Q will be maximised when all the coefficients of the representation of the digital image are used for the modulation, it is judicious to determine a modulation JND amplitude for a number of modulatable coefficients equal to the cardinal number of the set of coefficients representing the image.

This maximum value $\alpha_v$ or JND amplitude corresponds to the maximum modulation amplitude which can be used in the aforementioned linear insertion model beyond which an observer is capable of visually detecting a change in the reconstructed watermarked image.

In order to determine this JND amplitude, it is possible to use a visibility model which makes it possible to predict the visibility of a watermarking operation according to different parameters, namely the representation of the signal through a spatio-frequency transformation S used, the sub-band considered for the insertion, the type of distribution of the sequence of the watermarking signal W and the length P of the sequence W.

A simple model, developed by WATSON and described in the article entitled "Visibility of wavelet quantization noise", A. B. WATSON et al, IEEE Trans. on Image Process, 6(8), 1164–1175, 1997, makes it possible to predict the visibility of a set of modulated coefficients from the measurement of visibility of a single modulated coefficient. Reference can advantageously be made to this document for the detailed description of this model.

Thus use is made of a function dependent on the length P of the watermarking signal W, the type of transformation S used and the (base) sub-band considered for the insertion, but independent of all the coefficients to be watermarked X.

This calculation function used can be written:

$$\alpha_V(P, S, w) = \frac{\alpha_{base}(S)}{P^{1/\beta}(E[|w|^\beta])^{1/\beta}}$$

where $\alpha_{base}(S)$ is a base value, dependent on the transformation used S and on the (base) sub-band considered for the insertion, of the maximum weighting coefficient ensuring imperceptibility during modulation of a single coefficient of this sub-band, β is strictly greater than 2, and $E[|w|^\beta]$ is the mathematical expectation of the function $|w|^\beta$.

The base values $\alpha_{base}(S)$ can be measured once and for all, for each sub-band of coefficients in the wavelet decomposition, from a single psychovisual measurement, and be stored in a table of visual amplitudes.

β is the exponent of a Minkowsky sum and can be chosen equal to 5, for example.

The mathematical expectation $E[|w|^\beta]$ corresponds to an estimation of the mean of the function $|w|^\beta$.

This visibility model does not take into account the image I to be watermarked itself and is independent thereof. This is equivalent to considering that the image I is uniform. It is a question of a "worst case" model since the presence of the image signal makes it possible to visually mask the modulation itself.

The JND amplitude can thus be calculated for a length P of the watermarking signal W equal to the cardinal number of all the modulatable coefficients of the sub-band under consideration.

However, it is judicious to exploit the fact that the image signal itself makes it possible to mask the modulation.

Thus, in this example, use is made, for each coefficient $X_i$ to be modulated, of a weighting coefficient in accordance with a law of the form $\alpha_i = k_i \cdot \alpha_v$, where $k_i$ is a modulation factor dependent on the coefficients situated close to the coefficient considered on the region R and $\alpha_v$ is equal to the maximum JND value of the weighting coefficient.

Thus each coefficient will be modulated according to the local content, which makes it possible to locally increase the amplitude of the modulation to the benefit of detectability.

In order to test detectability in the test step E101, a detectability amplitude is next calculated from the detectability criterion and this detectability criterion is validated by comparing the detectability amplitude with a predetermined threshold value denoted Tc.

A calculation of correlation C(X*, W) between all the modulated coefficients X* and the marking signal W is generally made and it is decided whether there has actually been watermarking of the image when the result of the correlation calculation C(X*, W) is greater than the predetermined threshold value Tc.

A standardised statistical test can also be used for the detection, such as the one described in the article entitled "A method for signature casting on digital images" by I. PITAS, in Proc. ICIP, pages 215–218, September 1996. The detection is then characterised in terms of probability. It is thus possible to choose a threshold value Tc corresponding to a fixed detection probability level, for example 99.95%.

Thus, for a given region R defining a set of coefficients X of size P and with a fixed weighting coefficient $\alpha$, it is possible to calculate a detectability amplitude and compare it with a threshold value Tc so as to validate or not the detectability criterion on this region R.

The detectability criterion is in fact in theory a function depending on the size P of the region R, the detection threshold Tc related to the required detection probability, the watermarking signal W, the variance $\sigma^2_x$ of the coefficient X to be modulated on the region R and the weighting coefficient used $\alpha$ for modulating the coefficients X according to the linear model described above.

Thus, for example, for a detection by standardised hypothesis test and a value of the weighting coefficient $\alpha$ which is constant and equal to $\alpha_v$ for all the coefficients $X_i$ of the region R, a minimum length $P_{min}(X)$ is defined by the function:

$$P\min(X) = \left(\frac{2Tc}{a\alpha}\right)^2 [b\sigma_X^2 + ca^2 + d]$$

where a, b, c and d can be assimilated to constants. The signal being non-stationary, that is to say the variance $\sigma^2_x$ being a function of space, it is indeed necessary to adapt the modulation length P generated by the watermarking signal to the image signal itself.

On decoding, the set of coefficients X being modulated, this function also depends on the variance $\sigma^2_w$ of the inserted watermarking signal W.

In addition, it is necessary to provide for any distortions which the image may undergo after modulation, due for example to a compression of the image.

When this noise can be considered to be additive and decorrelated from the coefficients, it is possible to use a model dependent on the variance $\sigma^2_q$ of this additive noise modelling any distortions applied to said coefficients after modulation.

Thus, to a given weighting coefficient $\alpha$, making it possible to ensure invisibility of the inserted watermarking signal, a detection threshold Td fixed as a function of the detection probability required at decoding and a set of selected coefficients X, there also corresponds a minimum modulation length $P_{min}(X)$ which makes it possible to ensure detectability of the inserted watermarking signal.

On decoding, for a detection by standardised hypothesis test, this minimum length $P_{min}(X)$ is then defined by the function:

$$P\min(X) = \left(\frac{2Td}{a\alpha}\right)^2 [b(\sigma_X^2 + \alpha^2\sigma_W^2 + \sigma_q^2) + ca^2 + d]$$

where a, b, c and d can be assimilated to constants.

It is therefore necessary, if the same detectability test is used during coding and decoding, to choose a threshold value Tc on coding greater than that Td used at the time of decoding if it is wished to be able to find the same partitioning on decoding of the image.

In practice, the threshold value Td on decoding which it is wished to use is fixed, that is to say for example the required detection probability level when the detection is made by a standardised hypothesis test, and a higher threshold Tc on coding is chosen, in order to take account of the variance in the watermarking signal W and the variance of an additive noise fixed a priori so as to anticipate the influence of the subsequent processing undergone by the image.

This condition thus makes it possible to find the same detectability criterion which constrains the partitioning of the digital image without having to transmit to the decoder the partitioning effected at the time of insertion of the watermarking signal W.

In this example embodiment, a partitioning by iterative division of the digital image is effected. It is consequently considered, at step E101, that the detectability criterion is satisfied when the calculated detection amplitude is greater than or equal to the predetermined threshold Tc.

If the detectability criterion is not satisfied, then it is probable that the detectability criterion is also not satisfied in subregions of the initial region R of smaller size because the detection probability generally decreases with the size of the regions. A step E102 of stopping the method of determining a partitioning makes it possible to stop the process of iterative division of the image.

Insertion not being judged possible in the initial region R, the capacity Q of the image is therefore nil.

If on the other hand the detectability criterion is satisfied, that is to say here that the detection amplitude is greater than or equal to the threshold value Tc, it is possible that it is also satisfied for subregions of the initial region R.

It is therefore judicious to attempt to divide the region R as long as the detectability criterion is satisfied in order to increase the capacity Q.

There are of course several possible means for effecting the spatial division of the region R into subregions $R_j$, of sizes $P_j$, with j=1, ..., K.

Figure 4:
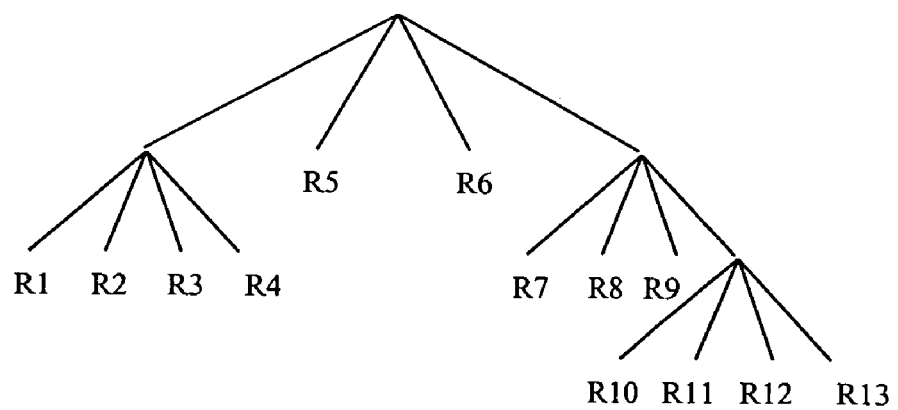
FIG. 4 is an example of partitioning of a region by division.

In this example a division into a quadtree is chosen, as illustrated in FIG. 4.

This division consists of dividing each region into four subregions of identical size.

Thus, by way of example, in FIG. 2, a digital image of initial size N is being partitioned into two sub-regions R5 and R6 of sizes N/4, seven subregions R1, R2, R3, R4, R7, R8, R9 of sizes N/16 and four subregions R10, R11, R12, R13 of sizes N/64.

Thus, at the division step E103, the region R is divided into subregions $R_j$, j=1, ..., K of sizes $P_j$. In a case of a division into a quadtree, K=4 and $P_j$=P/4.

At step E104 a first subregion of index j (for example j=1) is considered and a value of potential gain in capacity denoted $G_Q$ is initialised to −1.

The partitioning determination method then includes a prior step E105 of comparing the size $P_j$ of the region $R_j$ with the minimum size $P_{stat}$ corresponding to the minimum size of a statistically significant sample for the detection of a watermarking signal inserted in said region as described above.

If the size $P_j$ of the region $R_j$ is less than this minimum size $P_{stat}$, at step E108 the index J=J+1 is incremented in order to process the following sub-region $R_{j+1}$.

Otherwise, the detectability criterion is checked on the subregion $R_j$ in the same way as previously described with reference to step E101.

In practice, the watermarking signal is inserted on the coefficients of the said region $R_j$, a detection amplitude is calculated and this detectability amplitude is compared with the threshold value Tc.

The detection amplitude can be a correlation value between the modulation signal X* and the carrier of the watermarking signal W or the result of a standardised hypothesis test.

If the detectability criterion is verified, the value of potential gain in capacity $G_Q$ is increased by one unit at step E107.

Then at step E108 the index j of the subregions is incremented and it is checked at the test step E109 that this index j is less than or equal to the number of K.

In the affirmative, steps E105 to E109 are reiterated on the following subregion.

Otherwise, when the index j=K+1, it is checked in a test step E110, whether the potential gain in capacity value $G_Q$ is strictly positive, that is to say whether there exist at least two subregions $R_j$ of the initial region R for which the detectability criterion is validated.

In the negative, the partitioning of higher rank carried out on the initial region R is not validated and this region R is preserved. Such is the case when the detectability criterion has not been validated for any of the subregions $R_j$ or only for a single subregion $R_j$.

In the latter case, it is preferable to keep the region R for inserting the watermarking signal since it is of size P greater than the size of the single validated subregion $R_j$.

At step E112, the value of the capacity Q is then increased by one unit and the region R of size P in the partitioning is kept.

An actual insertion step E113 by modulation of the coefficients of the region R can then be implemented in a normal fashion using the linear insertion model described above.

An elimination step E114 then makes it possible to eliminate the region R from a stack of regions to be processed.

On the other hand, if at step E110 the value of the potential gain capacity Gc is strictly positive, in an addition step E111 all the subregions $R_j$ for which the detectability criterion is validated in the stack of regions R to be processed are added.

A return step E115 makes it possible to reiterate all the steps E103 to E113 in order to process the regions of the stack in a recursive fashion.

At the end of the recursive partitioning method just described, a capacity value Qm corresponding to the maximum capacity of the image for insertion of a watermarking signal is obtained, guaranteeing a correct detection of this signal. This maximum capacity Qm is equal to the cardinal number of the distinct regions obtained by the said partitioning on which the detectability criterion is validated.

In addition, the insertion step proper E113 can be omitted during a first "pass" which then makes it possible only to determine the maximum capacity Qm of the image and the validated regions.

Once the maximum capacity Qm has been calculated and the corresponding partitioning is stored in memory, it is then possible for a user to determine the message which he wishes to insert, corresponding to a number of information bits equal to the maximum capacity Qm, and then to insert this message in a normal manner by modulating the coefficients of the different regions obtained by the previously determined partition.

A description will now be given, with reference to FIG. 5, of a second embodiment of the invention in which it is wished to insert a message of fixed capacity Qs in an image I. Naturally, this fixed capacity Qs must have a value less than the maximum capacity Qm of the digital image to be watermarked.

Figure 5:
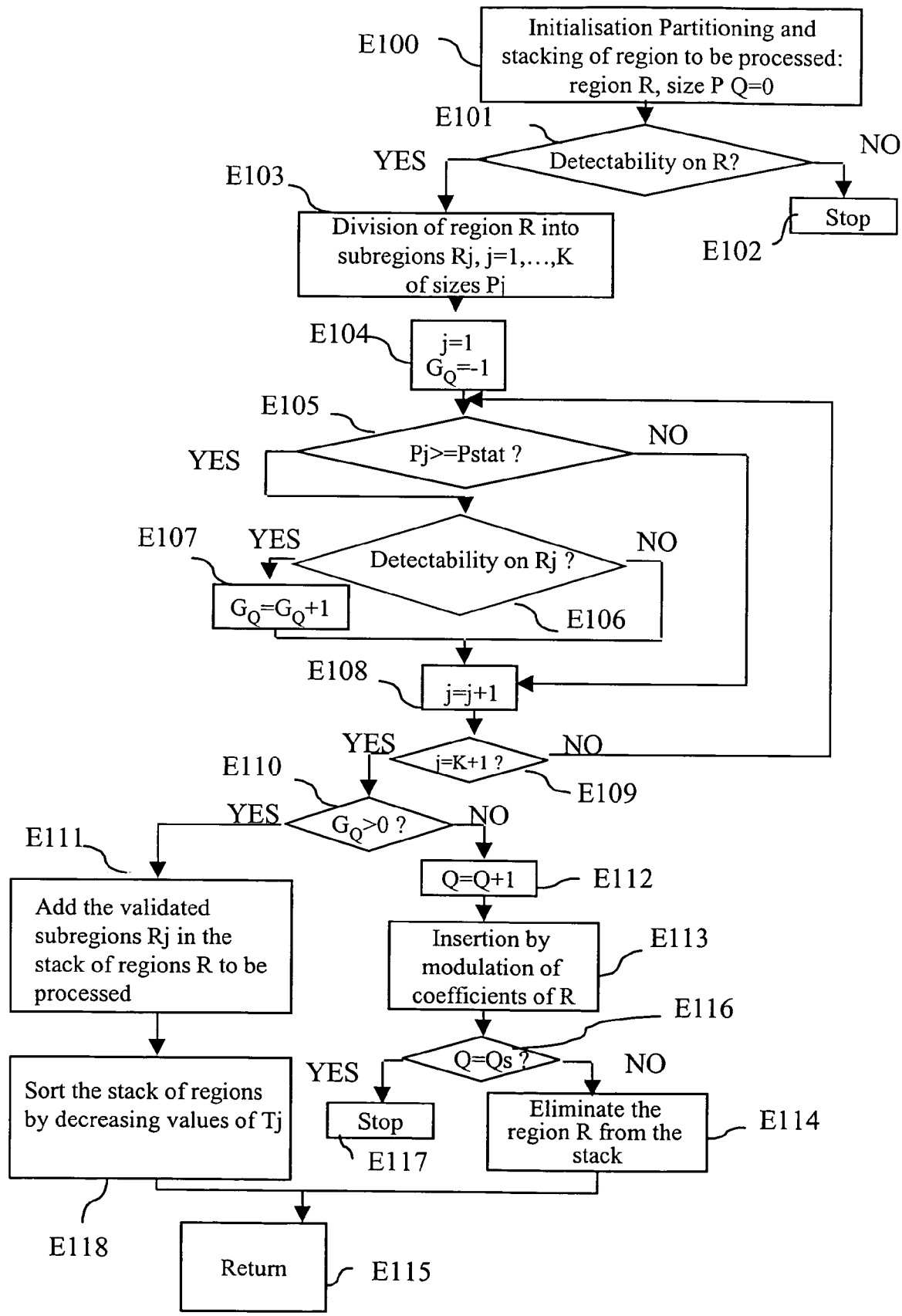
FIG. 5 is an algorithm of the method of determining a partitioning in accordance with a second embodiment of the invention.

As illustrated in FIG. 5, the method of determining a partitioning in this embodiment includes steps E100 to E113 identical to those of the method of determining a partitioning of the embodiment of FIG. 3 and which it is not necessary to describe again here.

As before, at step E112, the value of the capacity Q is incremented when the partitioning of rank directly higher is not validated.

Then the method includes a comparison step E116 in which this value of the capacity Q is compared with the fixed capacity value Qs.

In practice, it is tested at step E116 whether the capacity value Q is equal to the fixed capacity value Qs.

In the affirmative, a stop step E117 makes it possible to stop the iterative partitioning of the image since there are a number of regions equal to the number of information bits Qs which it is wished to insert.

Otherwise, in an elimination step E114, the processed region is eliminated from the stack of regions R to be processed formed at step E111.

The method of determining a partitioning also includes, in this embodiment, a sorting step E118 which sorts the regions R to be processed in the stack by detectability amplitude value calculated on these regions R.

Thus a return step E115 reiterates the partitioning from the division step E103 for a region R in the stack having the highest detectability amplitude amongst all the other regions to be processed.

A sorting variant can consist of sorting the regions to be processed in decreasing order of size so as to process, as a priority, the largest regions which a priori provide better detectability.

Naturally, a partitioning by iterative merging of the digital image could be carried out in the same way, for example also using a quadtree partitioning structure.

The initial partitioning then consists of regions with smaller acceptable sizes, greater than or equal to the previously defined minimum size $P_{stat}$.

For each region of the partitioning for which the delectability criterion is not validated, this region is merged with another region of the partitioning.

This other region of the partitioning is if possible a region for which the detectability criterion is not validated so as to increase the capacity.

Alternatively, another region can be a region satisfying the detectability criterion so as to make detection reliable.

There are many possibilities for the choice of the region to be merged. It is possible to take as the merger criterion the detection amplitude calculated on each of the regions and merge for example the regions associated with the lowest detection amplitudes.

In this particular case of a merging in a quadtree partitioning structure, the merging is structurally constrained and consists of deciding whether or not four adjacent blocks, for example R1, R2, R3 and R4 in FIG. 4, must be merged.

Figure 6:
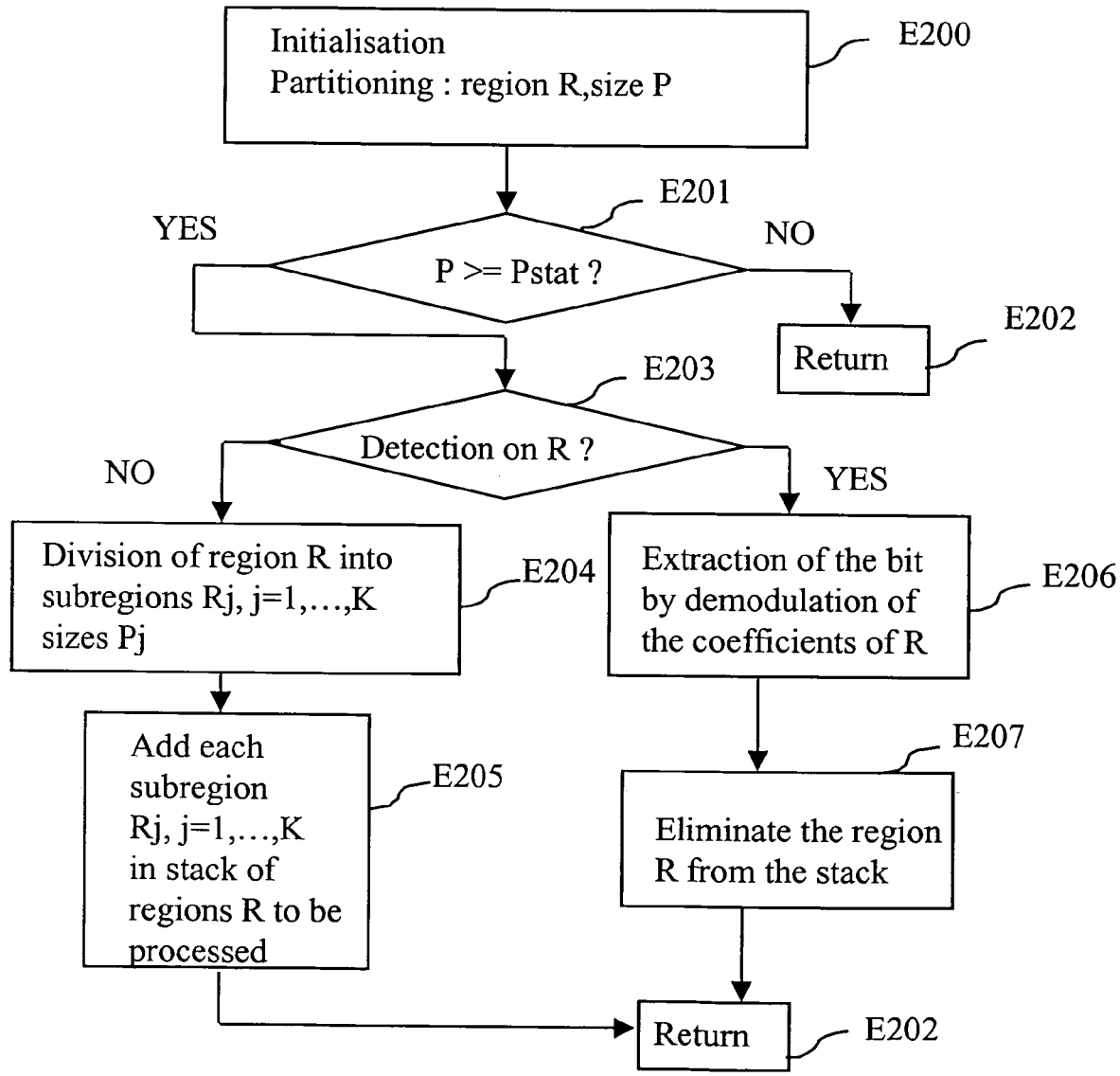
FIG. 6 is an algorithm of the decoding method according to a first embodiment of the invention.

A description will now be given, with reference to FIG. 6, of the associated decoding method which makes it possible to find the partitioning when the watermarking signal inserted in a digital image is extracted.

Indeed, because of the adaptation of the partitioning to the digital image, this partitioning will not be known a priori at the decoder.

The decoding method then consists, in general terms, of testing all the acceptable partitionings. The same iterative implementation technique is used as the one used when the partitioning is determined for inserting the watermarking signal.

Thus a description will be given of an example embodiment in the case of a segmentation by dividing by blocks in a quadtree, symmetrical to that using the partitioning determination method of the embodiment described with reference to FIG. 3.

At an initialisation step E200, there is an initial partitioning limited to a single region R of size P. This region consists of all the coefficients of the same representation of the digital image as the one used at the time of insertion of the watermarking signal.

A test step E201 makes it possible to verify that the size P of the initial region R is indeed greater than the minimum size $P_{stat}$ as described previously.

In the affirmative, at step E203 a criterion of detectability of the information bit inserted on the region R, obtained by demodulation of the coefficients on this region R, is verified.

In practice, a detection amplitude is calculated for all the coefficients of the region R and the detectability criterion is validated by comparing this detection amplitude with a predetermined threshold value Td for decoding.

It is possible to proceed by means of a standardised statistical test, and the result compared with the predetermined threshold value Td.

As explained before, it is necessary, if the same detectability test is used during coding and decoding, to choose a threshold value Tc on coding greater than that Td used at decoding if it is wished to be able to find the same partitioning on decoding of the image even when the latter has been made noisy by post-processing.

This condition thus makes it possible to find the same detectability criterion which constrains the partitioning of the digital image without having to transmit, to the decoder, the partitioning effected when the watermarking signal W was inserted.

If the detectability criterion is not verified at step E203, a division is carried out, at step E204, of the region R into subregions $R_j$ and sizes $P_j$ with j=1, ..., K. Then the same partitioning structure is used as the one used on coding, that is to say, in this example, a division of the region R into four subregions $R_j$ of identical sizes.

Then, in an addition step E205, the subregions $R_j$ are added in a stack of regions R to be processed and, at a return step E202, the decoding method is reiterated recursively as from the test step E201 on each region R of the stack.

When at the step of calculating the detectability criterion E203, the latter is verified for a region R, there is extracted at the extraction step E206 the information bit inserted in this region R as an element of the method inserted in the digital image I. This extraction is effected in a conventional fashion by calculating a detection amplitude. The result of the test gives, in absolute value, a detection amplitude to be compared with the threshold value Td of the decoding, the sign giving the value 0 or 1 of the information bit inserted.

It should be noted that this extraction is already partly effected during the detection step E203 so that the detection E203 and extraction E206 steps are structurally coupled.

An elimination step E207 is implemented in order to eliminate the region R from the stack of regions to be processed, which was formed at the addition step E205, and the return step E202 then makes it possible to implement the decoding method recursively on each region R of the stack to be processed.

Figure 7:
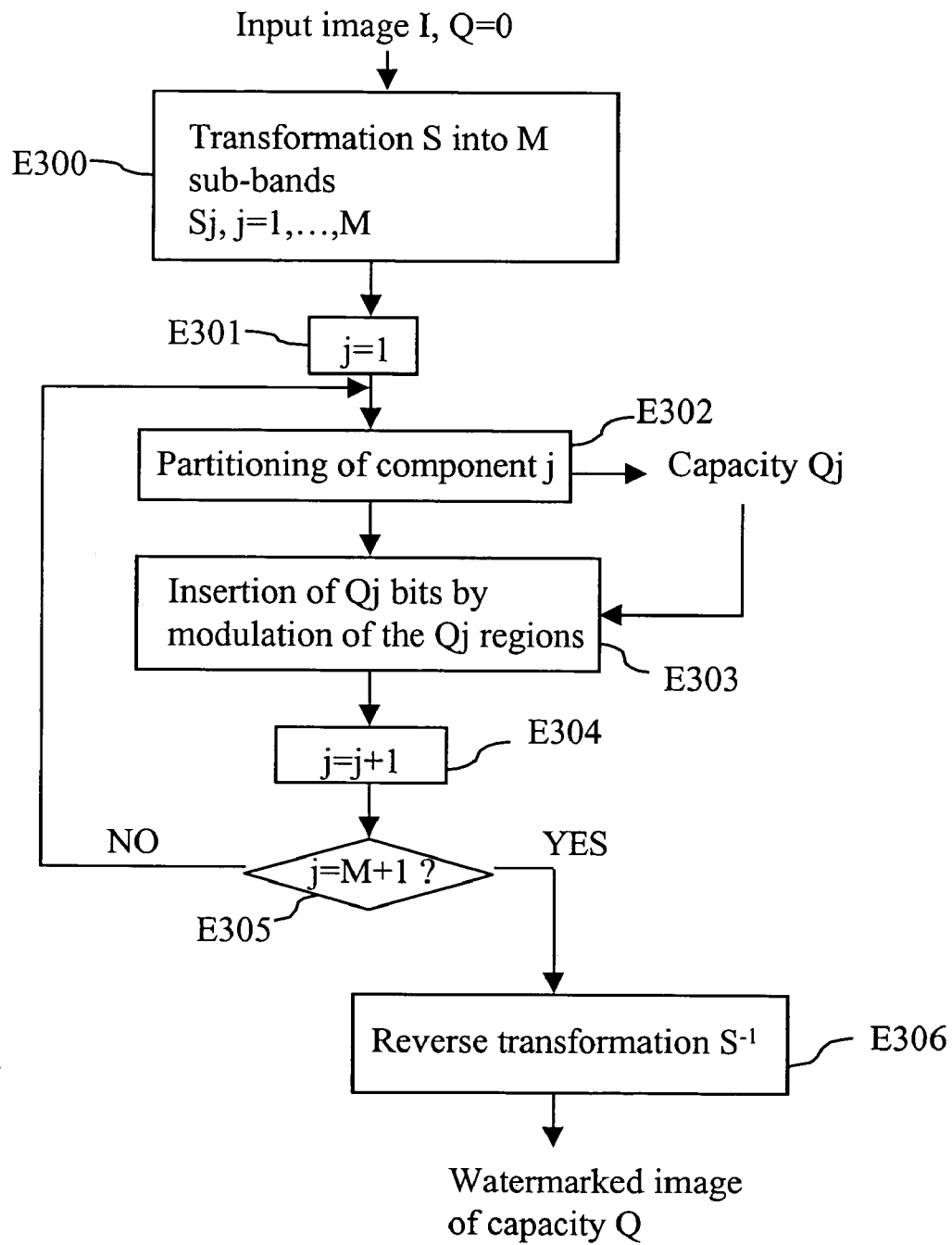
FIG. 7 is an algorithm illustrating the application of the method of determining a partitioning of FIG. 1 to a digital image.

A description will now be given, with reference to FIGS. 7 and 8, of a practical application of the method of determining a partitioning of a digital image in a particular embodiment of the invention.

In this application, the watermarking signal is inserted by means of a technique of insertion by spectrum spreading, by modulation of coefficients of a space-frequency representation of the image, obtained by a spatio-frequency transformation S of the digital image I as previously described with reference to FIG. 2.

In general terms $S_j$ sub-bands are obtained, with J=1, ..., M and M equal here to 13 at a transformation step E300.

Next, for each sub-band $S_j$ of index j considered at step E301, a partitioning is effected at step E302 by implementing the method of determining a partitioning described previously to with reference to FIG. 3.

In this way a capacity $Q_j$ is derived for each sub-band $S_j$.

A step E303 of insertion by modulation of the coefficients next makes it possible to insert $Q_j$ information bits in the $Q_j$ regions validated.

In steps E304 and 305, the following sub-bands are next considered as long as all the sub-bands $S_j$ have not been processed, and the steps E302 and E303 of partitioning and inserting a watermarking signal of capacity $Q_j$ are reiterated on each sub-band $S_j$.

Next, an inverse transformation $S^{-1}$ is applied to the image in order to obtain the watermarked image, of total capacity Q equal to the sum of the capacities $Q_j$ calculated for each of the sub-bands $S_j$.

Thus, each sub-band of the representation is considered independently for the adaptive partitioning which is carried out both at coding and at decoding.

Figure 8:
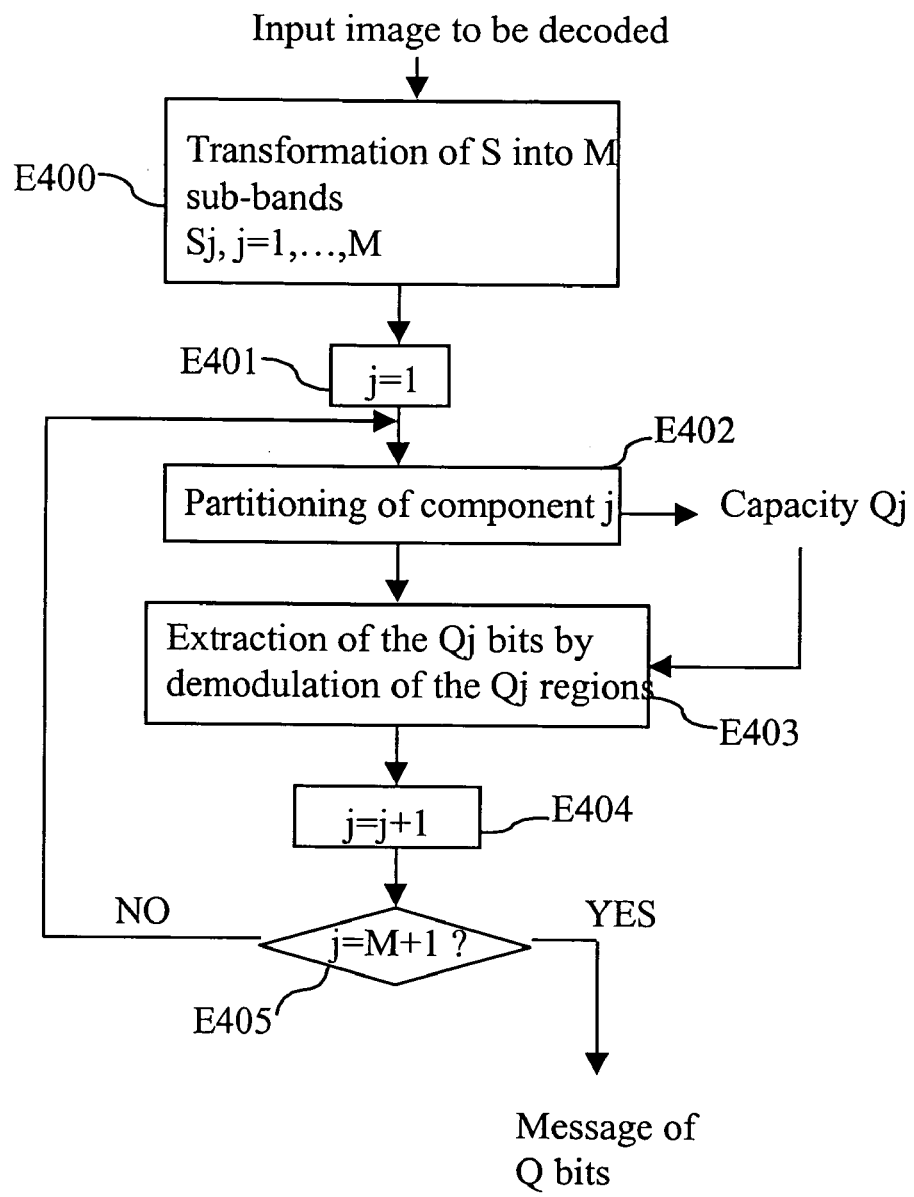
FIG. 8 is an algorithm illustrating the application of the decoding method of FIG. 4 to a digital image.

As illustrated in FIG. 8, the decoding method in this embodiment is implemented in a similar fashion using the decoding method described with reference to FIG. 6, the initial region R here corresponding each time to a sub-band of the decomposition of the image.

A step E400, identical to step E300, divides the image I into $S_j$ sub-bands with j=1, . . . M.

A first sub-band $S_j$ is considered at step E401. The order of processing of the sub-bands is identical to that used during coding in order to extract the inserted message in order.

The adaptive partitioning is implemented at the partitioning step E402 in order to calculate the capacity $Q_j$ of the sub-band $S_j$. Next, at the extraction step E403, the $Q_j$ information bits are extracted by demodulating the coefficients of the $Q_j$ regions of the partitioning.

At the test steps E404 and E405, it is checked in the usual-fashion that all the sub-bands have been processed and, in the negative, the decoding steps E402 and E403 (partitioning and extraction) are reiterated on the remaining sub-bands.

In this way, at the output of the decoder, a message of Q bits is obtained, Q being equal to the sum of the capacities $Q_j$ of each sub-band $s_j$.

Figure 9:
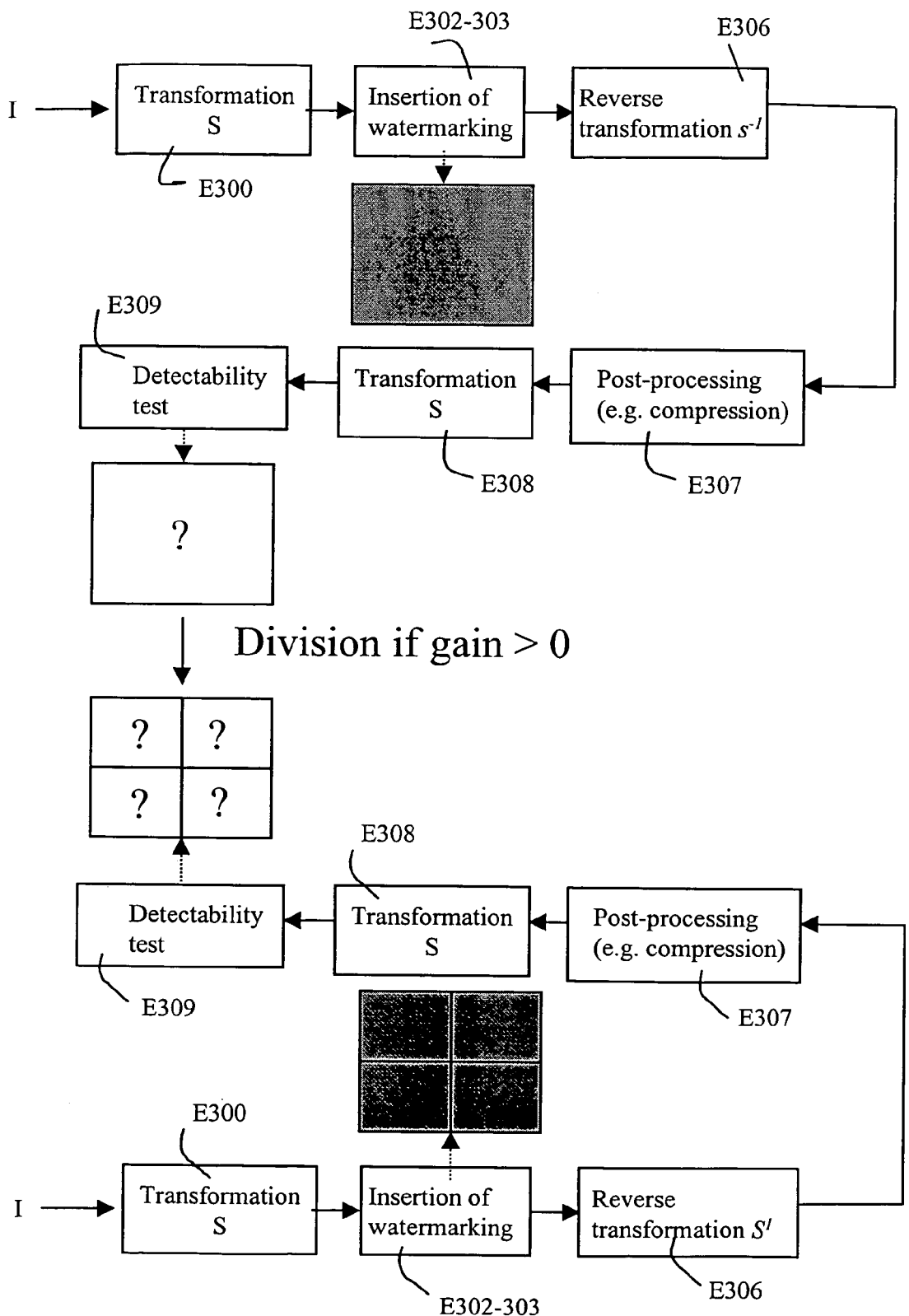
FIG. 9 is a block diagram illustrating a variant embodiment of the method of determining a partitioning in accordance with a third embodiment of the invention.

In a variant of this method illustrated in FIG. 9, it is possible to effect a partitioning on a post-processed image signal in order to obtain an a priori robustness of the watermarking signal to any post-processing undergone by the image.

The principle of this variant consists of performing a detectability test in a test step E309 which is no longer coupled to the steps of partitioning E302 and insertion E303 described previously.

After the insertion of the watermarking signal in a region, a reverse transformation $S^{-1}$ is first of all performed at step E306 in order to find the watermarked image. Then, in a step E307, post-processing is applied, such as a compression of the digital image.

Next, in a step E308, the transformation S is reiterated in order to find the watermarked coefficients, possibly made noisy by the post-processing carried out on the image at step E307, and the detectability criterion is calculated as previously described.

Steps E300 to E309 are reiterated on another acceptable partitioning of the image, here for example by dividing the relevant region R into four, and the detectability test is performed at step E309 on the four sub-regions.

This partitioning is adopted only if it represents a gain in capacity, that is to say, in this example of quadtree division, if the detectability criterion is validated on at least two sub-regions.

This variant embodiment makes it possible to directly take into account the post-processings which will be applied to the digital image.

A method of determining a partition according to a preferred embodiment of the invention will now be described, by reference to FIG. 10.

The method of inserting a watermark is employed on a digital image I.

This insertion method first of all includes a method of determining a partition of a set of coefficients representative of the digital image I.

This partition is applied as a function of a criterion of detectability of an information bit inserted on each region of the partition.

It should be noted that, in practice, a partition of a digital image into a maximum number of regions satisfying a detectability criterion can be sought so as to ascertain the practical capacity of this image with regard to the insertion of a watermark. This maximum capacity of the digital image corresponds to the number of information bits which it is possible to insert into the digital image while complying with the detectability criterion.

It is also possible, for a given watermark, comprising a given number of information bits of less than the maximum capacity of the image I, to seek the best possible partition of the image I which makes it possible to insert this watermark of given length, for a given detection probability, and in regions of the largest possible sizes so as best to ensure invisibility of the inserted watermark.

The method of determining a partition first of all includes a step of spectral decomposition E500 of the wavelet-decomposition type described previously (Discrete Wavelet Transform or DWT).

Thus a set of spectral coefficients X is obtained, representative of the digital image I. These spectral coefficients are distributed into frequency sub-bands as illustrated diagrammatically in FIG. 2, on completion of the decomposition step E500. The size of the set of coefficients X is equal to N=M×M for a square image. Obviously, the same method could be applied to a rectangular image.

In this embodiment of the invention, the method includes a step E501 of generating a centred pseudo-random sequence of size N equal to the cardinal number N of the set of coefficients X representative of the image I.

Let $w=\{w_{mn}, 0 \leq m, n \leq M\}$ be this pseudo-random sequence.

This pseudo-random sequence w is formed from centred pseudo-random sub-sequences $w^k$.

The pseudo-random sequence can be seen as the merging of the pseudo-random sub-sequences $w^k$.

Here, the centred pseudo-random sequence w is formed from pseudo-random sub-sequences $w^k$ of identical size which correspond to a block, called unit block, of the set of coefficients X.

Obviously, the pseudo-random sub-sequences $w^k$ could differ in size from one another.

Here, the size of these unit blocks corresponds to the minimum number of coefficients suitable for forming a region of a size which is statistically significant for satisfying the detectability criterion over this region.

As described later, when a standardised statistical detection test is applied to a set of coefficients, a minimum number of coefficients is necessary for this test to be significant.

The pseudo-random sub-sequences $w^k$ are of a size A=L×L which is greater than or equal to this minimum number of coefficients.

For preference, pseudo-random sub-sequences $w^k$ are chosen to be equal in size to this minimum size. This characteristic is particularly advantageous when partition is achieved by iterative combination by combining blocks from an initial segmentation of the image into unit blocks of size L×L. The initial segmentation then corresponds to the maximum partition of the image which can be applied, beyond which the blocks of coefficients generated are no longer statistically significant for the insertion and detection of an information bit.

For example, L=8 is chosen.

The pseudo-random sequence w is then the merging of N/64 pseudo-random sub-sequences $w^k$ forming unit blocks.

On each unit block, in accordance with the invention, a centred pseudo-random signal of predefined-distribution-(Gaussian, uniform, etc.) has to be generated on the basis of a function depending on a secret key K and on the index k of each unit block. This key can be denoted f(K, k). It is then necessary to ensure that, in practice, the average of the signal $w^k$ is exactly equal to zero over each unit block.

A first method for generating such a centred pseudo-random sequence consists in centring the sequence in a deterministic way, by symmetrisation. This method is suitable for generating a pseudo-random sub-sequence of even size A.

In this case, each centred pseudo-random sub-sequence $w^k$ is created by generating one half, A/2, of the pseudo-random samples of the sub-sequence via a pseudo-random number generator of known centred distribution, and by symmetrising the pseudo-random samples thus generated in order to obtain the other half A/2 of the samples of the sub-sequence $w^k$.

For a single-dimensional sequence, a set of samples of size A/2 $\{w_j, 1 \leq j \leq A/2\}$ is therefore generated, and this set is made symmetric in order to obtain the other half of the samples $\{w_j = -w_{A-j}, A/2 < j \leq A\}$.

In order to reinforce the random character of the sequence thus obtained, permutation can be carried out on the set of samples obtained $\{w_j, 1 \leq j \leq A\}$ by using a secret key.

A second method of generating a centred pseudo-random sequence consists in creating each centred pseudo-random sub-sequence $w^k$ by generating pseudo-random samples via a pseudo-random number generator and by redistributing the sum of these pseudo-random samples generated over each sample.

Thus, first of all, by using the secret key f(K, k), a sequence of pseudo-random samples of the same size A as the unit block, i.e. $\{w_i, 1 \leq i \leq A\}$, is generated.

Next the exact sum of these samples is calculated:

$$S_k = \sum_{i=1}^{A} w_i$$

Then this sum $S_k$ is redistributed over the samples so as to obtain a centred pseudo-random sequence, that is to say one with a sum exactly equal to zero.

Thus $w^k = \{w_i - S_k/A, 1 \leq i \leq A\}$ is obtained.

The pseudo-random sequence w is thus composed of the merging of the centred sub-sequences $w^k$ in such a way that the partitioning of a set of coefficients modulated by the centred pseudo-random sequence w gives rise to subsets of coefficients also modulated by centred pseudo-random sub-sequences.

Obviously, other techniques could be used to generate centred pseudo-random sequences.

Figure 10:
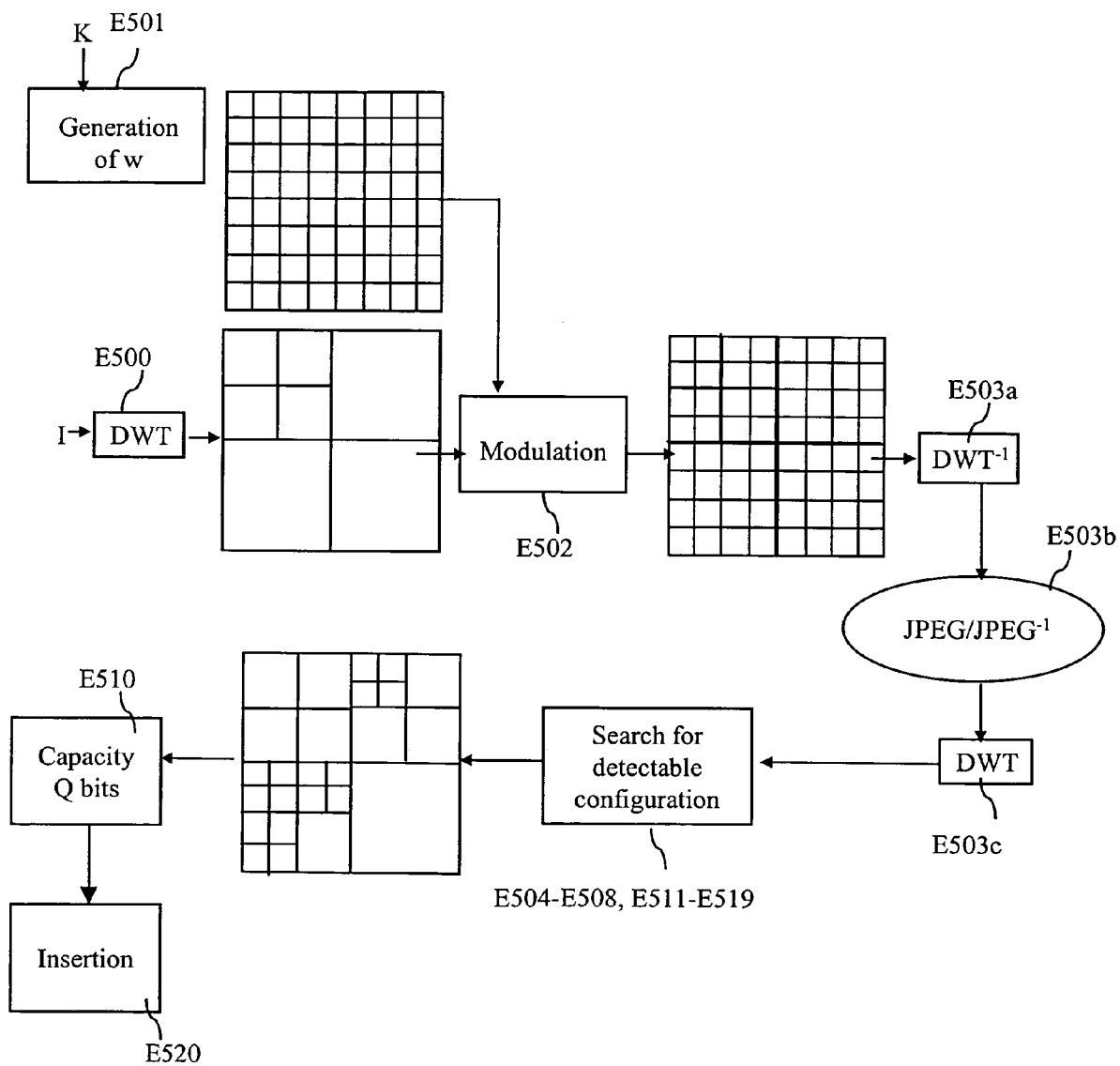
FIG. 10 illustrates the application of the method of determining a partition to a digital image according to a preferred embodiment of the invention.

As illustrated in FIG. 10, a step E502 of modulation of the set of coefficients by the centred pseudo-random sequence w is then implemented so as to insert an information bit onto the set of coefficients originating from the spectral decomposition.

In practice, the set of coefficients is copied into a working memory, for example a random-access memory in a computer, so as not to mark the image I directly.

The same information bit is modulated onto the set of coefficients, for example b=1 here, according to the modulation formula:

$$X'_i = X_i + \alpha_i w_i, \text{ with } 0 \leq i \leq N.$$

The weighting amplitude $\alpha_i$ is chosen in the usual way so as to guarantee invisibility of the inserted information bit.

A constant weighting coefficient can be used for all the coefficients, such that $\alpha_i = \alpha_v$ for all i, the value of the weighting coefficient $\alpha_v$ being equal to a maximum value ensuring imperceptibility of the watermark for modulation of the set of coefficients representative of the digital image.

It may be worthwhile exploiting the fact that the image signal itself makes it possible to mask the modulation.

To this end, it is possible, for each coefficient $X_i$ to be modulated, to use a weighting coefficient according to a rule of the form $\alpha_i = k_i \cdot \alpha_v$, where $k_i$ is a modulation factor depending on the coefficients situated in the vicinity of the coefficient in question and $\alpha_v$ is equal to the maximum value of the weighting coefficient ensuring imperceptibility of the watermark for the modulation of the set of coefficients.

Thus, each coefficient will be modulated as a function of the local content of the image, which makes it possible locally to augment the amplitude of the modulation to the benefit of the detectability.

For preference, in this embodiment of the invention, it is wished to apply a partitioning to a post-processed image signal so as to obtain robustness, a priori of the inserted watermark, against any post-processing undergone by the image I.

To do that, a distortion is applied, in a distortion step E503, to the set of modulated coefficients.

By virtue of the modulation of the coefficients in a single operation, on the basis of a centred pseudo-random sequence, the distortion step E503 can be implemented once only upon determination of a partition, in contrast to the prior techniques in which each sub-region of coefficients was modulated independently of the other and required distortion to be applied to each level of the partition.

This is all the more advantageous since, here, the step E503 of applying a distortion includes the following sub-steps as illustrated in FIG. 10:

inverse spectral transformation E503a of the set of coefficients $X'_i$ modulated in order to obtain a watermarked image;

application proper, E503b, of distortion to the watermarked image; and spectral transformation E503c of the watermarked image in order to obtain a set of modulated coefficients after distortion.

The distortions applied are distortions which alter the value of the pixels without altering the geometry of the image, such as the addition of noise, alteration of the contrast, compression, low-pass or high-pass filtering, for example.

Compression of the image is considered here, according to the JPEG standard (for Joint Photographic Expert Group) with specified quality factor, with q=75 typically by default for JPEG compression.

In practice, an inverse wavelet transformation $DWT^{-1}$ is applied here, then compression followed by decompression of the image, and finally forward wavelet transformation again in order to be able to estimate the detectability of the information bit inserted in the spectral domain.

Next an iterative partitioning of the set of coefficients is applied, so as to search for a partition of the set of coefficients in which each inserted information bit can be detected correctly according to a fixed detection probability. The number of regions thus determined during the partition corresponds to the practical insertion capacity of the image I.

The means for displaying to the users Q bit determined by calculating the capacity should exist.

Various techniques for iterative segmentation by division/combination can be used as previously described.

Figure 11:
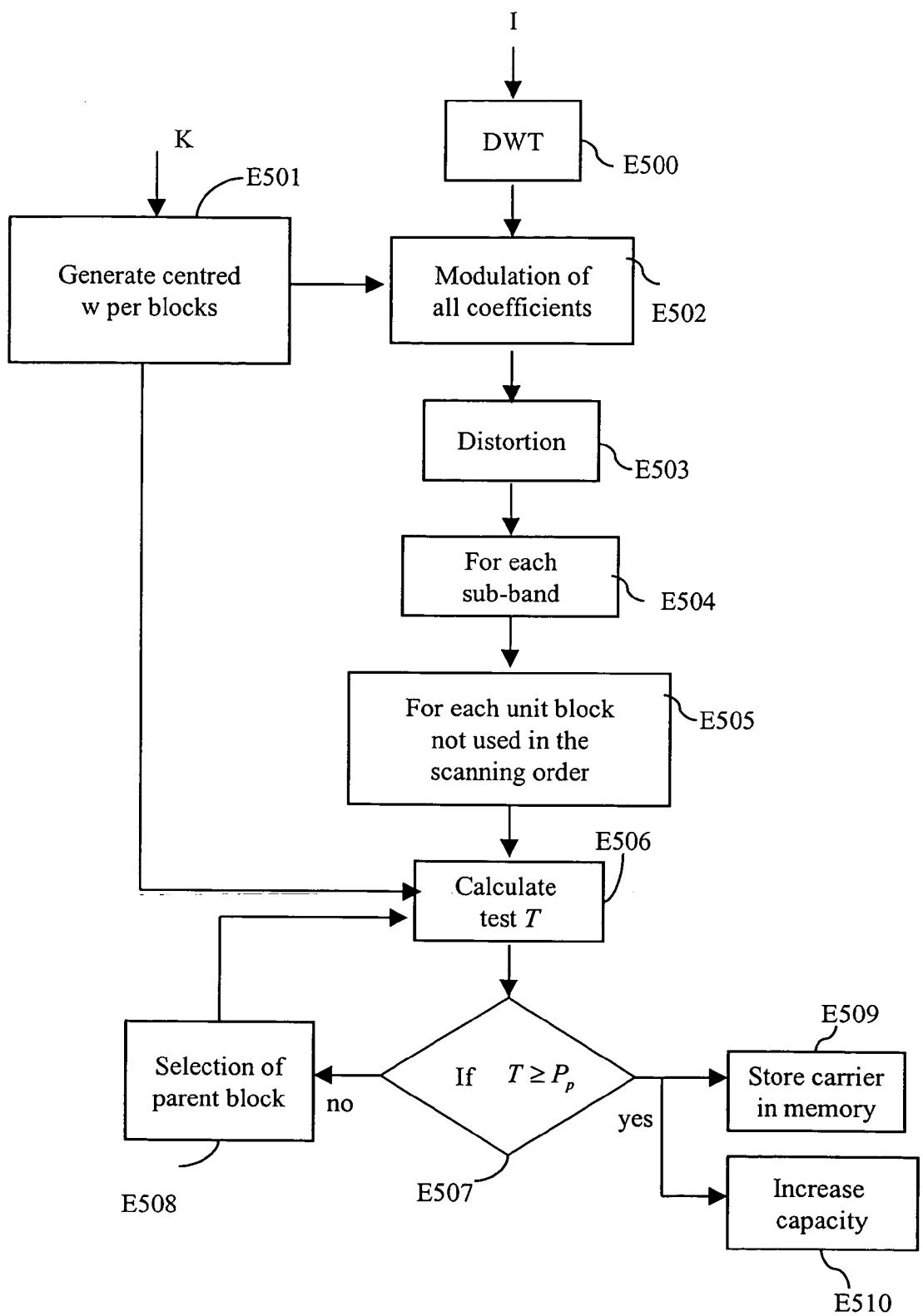
FIG. 11 is an algorithm of the method of determining a partition in accordance with a first way of the preferred embodiment of the invention.

A first way of performing the preferred embodiment of the invention will firstly be described, by reference to FIG. 11, in which the partitioning is achieved by iterative division on the basis of an initial segmentation of the set of coefficients into regions of a statistically significant size for validating a detectability criterion over these regions.

Following on from the steps of transformation E500, generation E501, modulation E502 and distortion E503 as described above, a first frequency sub-band will be considered, in a step E504, as a set of coefficients to be partitioned.

The initial segmentation of this set of coefficients corresponds to a spatial segmentation of the image I into blocks of unit size as defined above.

By its very construction, the pseudo-random modulation sequence is centred on each of these unit blocks.

In a quadtree-mode combination, it is always four blocks of equal size which are grouped together, called "child blocks" in order to form a "parent block", and this combination is recommenced iteratively, giving the notion of recursiveness.

Obviously, partition takes place frequency sub-band by frequency sub-band of the signal arising from the spectral decomposition.

Each unit block is considered here, in a step E505, in an order of scanning of the sub-band, for example from left to right and from bottom to top.

A validity criterion is applied over a first unit block which has not yet been processed.

In a calculation step E506, a statistical detection test is applied to this unit block of modulated coefficients $X'_i$.

An example of a standardised statistical test is given below.

Let $X'_i$, $1 \leq i \leq P$ be the set of coefficients to be tested after insertion of the pseudo-random sequence w and application of pre-distortion.

The test consists in calculating, for this set of size P:

$$T = \frac{M}{\sqrt{V}} \sqrt{P}$$

in which M represents an average value of correlation between the values of each coefficient $X'_i$ and of modulation $w_i$, and V the variance of these values.

Hence in practice:

$$M = \frac{1}{P} \sum_{i=1}^{P} w_i(X'_i - M_x), \text{ with } M_X = \frac{\sum X'_i}{P} \text{ and}$$

$$V = \frac{1}{P-1} \sum_{i=1}^{P} [w_i(X'_i - M_X) - M]^2.$$

The calculation of this test value T requires knowledge of the pseudo-random modulation sequence w which is generated once and for all at the above-described generation step E501.

The detectability is given by the comparison of this test value T with a certain threshold $P_p$, which corresponds theoretically to a probability of correct detection of p % if the test T follows a Gaussian law with variance equal to 1 for the two hypotheses tested (presence or absence of watermark).

A comparison step E507 makes it possible to compare this test value T with the threshold value $P_p$ or correct detection rate.

On completion of this comparison, if the calculated value T is higher than the correct detection rate, the block tested is held in memory, in a memory-storage step E509, as being a region available for inserting an information bit.

In practice, a capacity-calculating step E510 can be implemented in such a way that, for every block of coefficients tested which is suitable for having an information bit inserted, the value of the capacity is increased by one unit.

In contrast, if the calculated value T is less than the correct detection rate $P_p$, a block of higher level is selected, in a combining step E508, that is to say, here, a parent block corresponding to the combination of four unit blocks, and the steps E506 of calculating the test value T and of comparison E507 with the correct detection rate $P_p$ are reiterated over this new block.

During this combining of child blocks in order to form a parent block, those child blocks are preferably chosen for which the detectability criterion is not satisfied.

For application of this detectability criterion, any standardised statistical test can be used for the detection, such as that described in the article entitled "A method for signature casting on digital images" by I. PITAS, in Proc. ICIP, pages 215–218, September 1996, which makes it possible to characterise the detection in terms of probability.

A threshold value $P_p$ can be chosen, corresponding to a fixed level of detection probability, 99.95% for example.

Hence, for a given region defining a set of coefficients X of size P and with a fixed weighting coefficient α, it is possible to calculate a detectability amplitude and to compare the latter with a threshold value $P_p$ so as to validate or not validate the detectability criterion over this region.

In a general way, the detection probability decreases with the size of the regions tested, such that, by combining regions in order to increase the size of the block of coefficients used for inserting a watermark, the value of the test T is increased over this new block.

Hence, on completion of these steps of adaptive partitioning E504 to E508, an image insertion capacity can be determined, equal to Q bits, as can an appropriate partition of the image corresponding to this capacity Q.

A watermark can then be formed, with length equal to Q bits, and can then be inserted, bit by bit, into the various regions of the partition.

Obviously, the step E520 of insertion proper of the watermark can be coupled with the determination of the partition, in such a way that each region available on conclusion of the detectability test E506, E507, can actually be watermarked by the insertion of an information bit by modulation of the coefficients of this region.

The insertion step E520 makes it possible actually to insert an information bit of the watermark, by choosing a coefficient value b=1 or =−1 in the above-described modulation formula, the alternating of the +/−1 bits conveying the content of the message inserted.

A centred pseudo-random sequence of known distribution can be used, different for each region of the partition, and initialised by a secret key K', as illustrated in FIG. 1.

It should be noted that this secret key K' may, if appropriate, be identical to the secret key K used during the generation of the pseudo-random sequence w for determining the partition.

Moreover, a centred pseudo-random sequence w identical to that generated at the generation step E501 could be generated.

A partition of an image I is shown diagrammatically by way of example in FIG. 10, on conclusion of steps E504 to E508, in which, for example, 25 separate regions are obtained making it possible to insert a 25-bit watermark.

Obviously, any other partitioning technique could be used.

Figure 12:
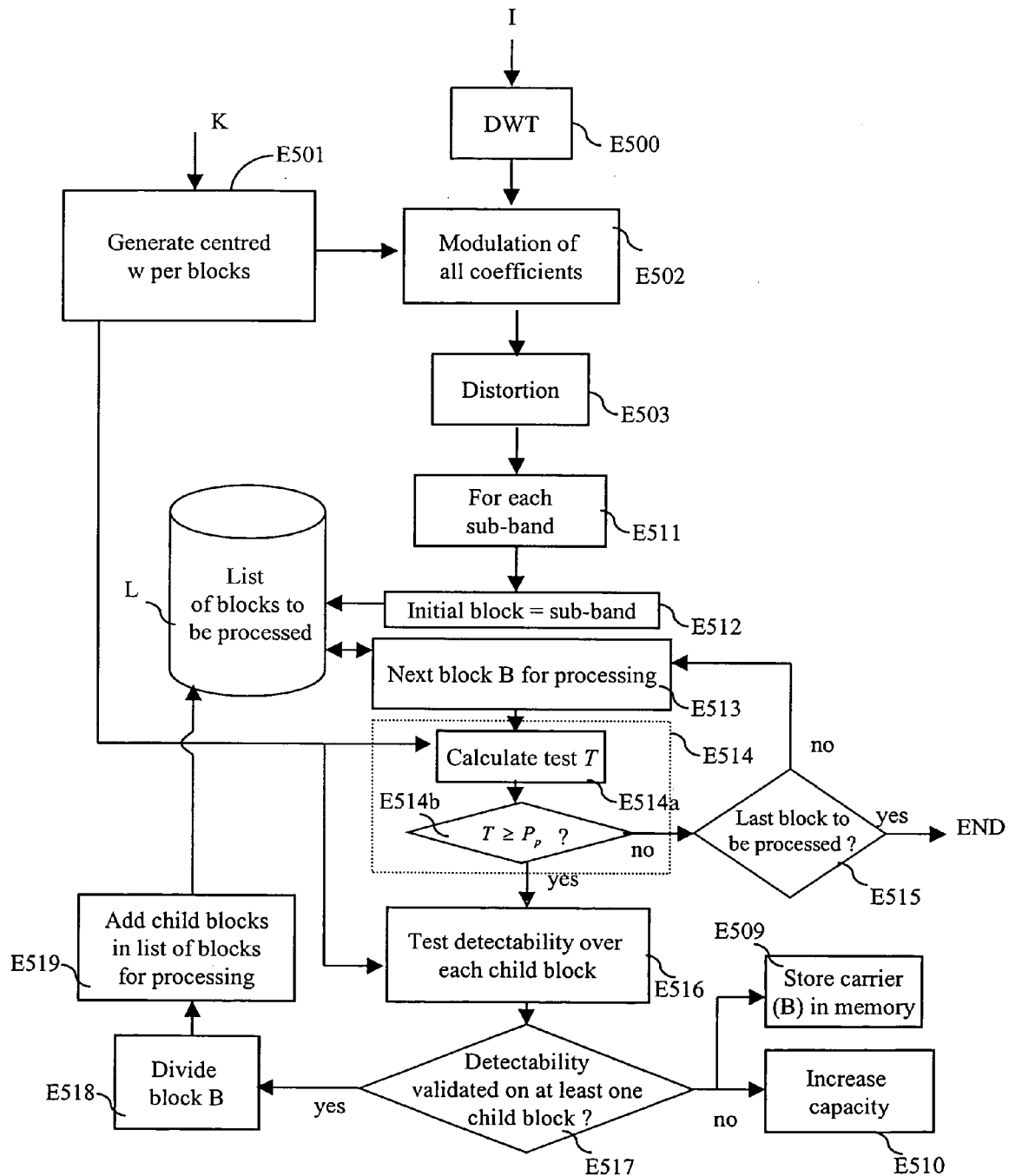
FIG. 12 is an algorithm of the method of determining a partition in accordance with a second way of the preferred embodiment of the invention.

A second way of performing the preferred embodiment of the invention will now be described, by reference to FIG. 12, in which the partitioning is achieved by iterative division of the set of coefficients.

On conclusion of the steps of transformation E500, generation E501, modulation E502 and distortion E503 as described above, a first frequency sub-band will be considered, in a step E511, as set of coefficients to be partitioned.

A quadtree-mode division will be considered here, in which one block, called "parent block" is always divided into four blocks of equal size, called "child blocks".

Obviously, partition takes place frequency sub-band by frequency sub-band of signal originating from the spectral decomposition.

Hence, in a step E512, an initial block corresponding to a first frequency sub-band is considered.

This initial block is stored in memory in a list L of blocks to be processed.

Next, in a step E513, a first block B to be processed, coming from the list of blocks to be processed L, is considered.

A detectability criterion is applied on this block B in a checking step E514.

In practice, as previously described, the value T of a statistical detection test on this block of modulated coefficients is calculated in a calculation step E514a. This step is analogous to the calculation step E506 described by reference to FIG. 11.

The detectability is then given by the comparison of this test value T with a certain threshold $P_p$, which theoretically corresponds to a correct detection probability of p % if the test T follows a Gaussian law with variance equal to 1 for the two hypotheses tested (presence or absence of watermark).

A comparison step E514b makes it possible to compare this test value T with the threshold value $P_p$ or correct detection rate. This comparison step E514b is analogous to the comparison step E507 described by reference to FIG. 11.

On completion of this comparison, if the calculated value T is less than the correct detection rate $P_p$, a check is made, in a test step E515, as to whether there are blocks remaining to be processed in the list L.

If not, the recursive partitioning algorithm is terminated.

Otherwise the following block B of the list L is considered at step E513, and the checking step E514 is reiterated.

If, on completion of the comparison step E514b, the calculated value of the test T is higher than the correct detection rate $P_p$, detectability is tested over each child block of this parent block B in a checking step E516.

In practice, the parent block B is divided into four child blocks and the detectability criterion is checked on each of these blocks according to a step analogous to the previously described checking step E514.

A test E517 makes it possible to verify whether the detectability criterion is valid over at least one child block.

If yes, a division step E518 is implemented in order to actually divide the block B into four child blocks, and an addition step E519 allows these child blocks to be added to the list of blocks to be processed L.

The test and checking steps E513 to E519 are then reiterated over each of the blocks of the list L until the latter is empty.

In contrast, if, on conclusion of test E517, the detectability criterion is not satisfied on any of the child blocks of the parent block B, the tested block B is held in memory in a memory-storage step E509 as a region available for inserting an information bit.

In practice, a step of updating the capacity E510 can be implemented as described previously, in such a way that, for each block of coefficients tested which is suitable for insertion of an information bit, the value of the capacity is increased by one unit.

Hence, on conclusion of these adaptive partitioning steps E511 to E519, an image insertion capacity can be determined, equal to Q bits, as can an appropriate partition of the image corresponding to this capacity Q.

A watermark can then be formed, with length equal to Q bits, and can then be inserted, bit by bit, into the various regions of the partition.

Obviously, as before, the step E520 of insertion proper of the watermark can be coupled with the determination of the partition, in such a way that each block B available on conclusion of the detectability test E507, can actually be watermarked by the insertion of an information bit by modulation of the coefficients of this block B.

The insertion step E520 is carried out in the same way as when partition is achieved by iterative combination.

Moreover, in one enhanced embodiment of this technique of partition by iterative division, a division of a parent block B into child blocks can be adopted on completion of the detectability test E507 only if it represents a gain in capacity, that is to say into a quadtree-mode division only if the detectability criterion is satisfied over at least two child blocks. Otherwise, it may be preferable to keep the parent block of larger size so as to guarantee better invisibility of the inserted watermark.

Obviously, the partitioning techniques described previously are not in any way limiting.

Notably, it is possible to use various iterative segmentation techniques by division/merging, to which there belong the quadtree block partitioning described previously, but also graph partitioning. In general terms, there are the so-called bottom-up methods and the top-down methods depending on whether the iterative partitioning means is merging or division.

Hence it is possible, if appropriate, to combine two techniques of partitioning by division and combination. This is the case when an initial partition is chosen, for example, intermediate between the two extremes which are, on the one hand, a single region and, on the other hand, a partition into regions of the smallest admissible size, allowing both the operations of division and of combination.

It is also possible to implement the method of determining a partition in order to maximise the capacity of the digital image by using several different segmentation techniques and then choosing the partition which confers the greatest capacity Q for the digital image.

It is also possible to determine the best partition possible, that is to say the one yielding a set of blocks of coefficients of largest possible size, for inserting a fixed-length message, less than the maximum capacity of the digital image to be watermarked.

In all cases, the present invention makes it possible to generate and to insert a pseudo-random sequence once only over a set of coefficients which are available for carrying out the insertion, and, as a corollary, to apply only one single pre-distortion to the set of coefficients.

It is thus possible rapidly to obtain a partition of the set of coefficients which makes it possible to insert a watermark with a fixed correct detection probability for an entire range of distortion lying between "no distortion" and "predetermined distortion" applied during the determination of the partition. Moreover, the simulation of maximum distortion before insertion is a quasi-deterministic operation which confers an advantage with respect to a theoretical statistical calculation.

A description will be given now of the insertion method according to the invention in a preferred embodiment.

The watermarking signal is inserted after a transformation step E600, in a set of coefficients of the domain transformed into sub-bands.

Figure 13:
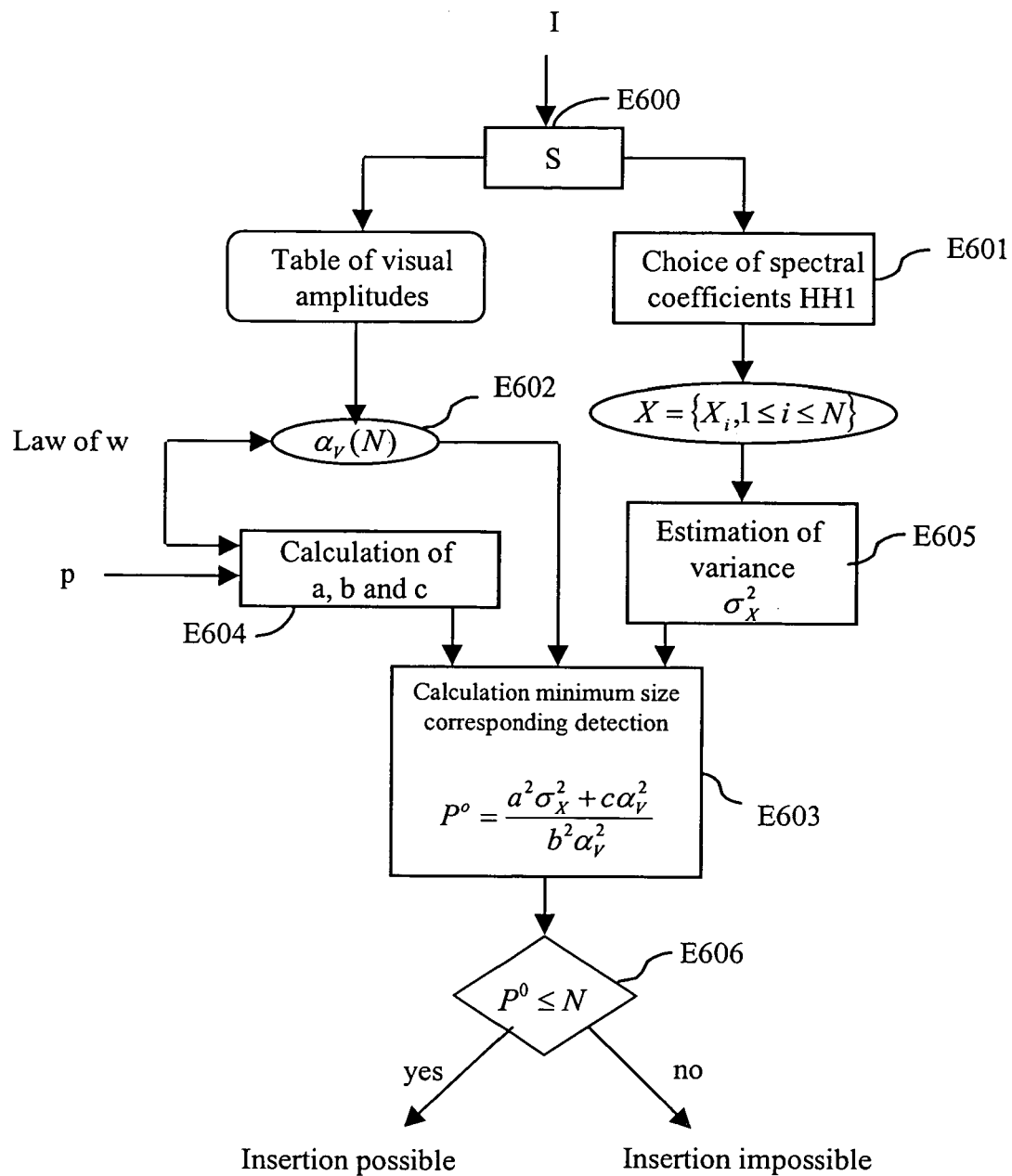
FIG. 13 is an algorithm of the insertion method according to one embodiment of the invention.

As illustrated in FIG. 13, in a choosing step E601, there is for example chosen the high-frequency sub-band $HH_1$, with the first resolution level, corresponding to a high-pass filtering in the horizontal and vertical directions.

There is thus a set of spatio-frequency coefficients, with a cardinal number equal to N, denoted for example $X=\{X_i, 1 \leq i \leq N\}$.

For an image I of size 512×512, the sub-band $HH_1$ is of size N=256×256.

Since the watermarking has to be imperceptible and indelible, and therefore difficult to locate and remove by pirating, it is chosen to insert a pseudo-random watermarking signal, spreading its spectrum in order to make this signal undetectable by spectral or statistical analysis.

For example, a pseudo-random sequence w is considered, which follows a uniform law on the interval [−1, 1] with $w=\{w_i, 1 \leq i \leq P\}$, the length P of the sequence being less than or equal to N.

Naturally, any pseudo-random watermarking signal, with a known distribution and a nil mean, may be suitable. The most usual distributions for the watermarking signal w are, apart from the uniform distribution on [−1, 1] mentioned above, the binary distribution {−1,1} and the centred standardised Gaussian distribution N(0, 1).

The modulation which it is wished to apply to the coefficients in order to insert the watermarking signal uses a linear model of the type:

$$X'_j = X_{j(i)} + \alpha w_j, \text{ with } 1 \leq j \leq P \text{ where}$$

$X_{j(i)}$ is a subset of spectral coefficients chosen from the set of coefficients X, and α is a weighting coefficient.

Here, the weighting coefficient α is constant for any j.

In this example embodiment, it is sought to determine whether the insertion of the watermarking signal w is actually possible in the set of coefficients X whilst meeting predetermined criteria of imperceptibility and detectability.

According to the invention, the insertion method first of all includes a step E602 of calculating a maximum value $\alpha_v$ of the weighting coefficient α as a function of the length P of the watermarking signal w ensuring imperceptibility of the watermarking signal w.

This maximum value or visual amplitude $\alpha_v$ corresponds to the maximum modulation amplitude which can be used in the aforementioned linear insertion model beyond which an observer is capable of visually detecting a change at the level of the reconstructed watermarked image.

In this embodiment, a visibility model is used which makes it possible to predict the visibility of a watermarking operation as a function of the different parameters, which are the representation of the signal through the spatio-frequency transformation T used, the sub-band $HH_1$ considered for the insertion, the type of distribution of the sequence of the watermarking signal w and the length P of the sequence w.

A simple model, developed by WATSON and described in the article entitled "Visibility of wavelet quantization noise", A. B. WATSON et al, IEEE Trans. on Image Process, 6(8), 1164–1175, 1997, makes it possible to predict the visibility of a set of coefficients modulated from the measurement of visibility of a single modulated coefficient. Reference can advantageously be made to this document for a detailed description of this model.

During the step E602 of calculating the maximum value $\alpha_v$, use is thus made of a function dependent on the length P of the watermarking signal w and on the type of spectral transformation T used, but independent of the set of coefficients to be watermarked X.

This calculation function used can be written:

$$\alpha_V(P, S, w) = \frac{\alpha_{base}(S)}{P^{1/\beta}(E[|w|^\beta])^{1/\beta}}$$

where $\alpha_{base}(S)$ is a base value, dependent on the transformation used S and the (base) sub-band considered for the insertion, of the maximum weighting coefficient ensuring imperceptibility when a single coefficient of this sub-band is modulated, β is strictly greater than 2, and $E[|w|^\beta]$ is the mathematical expectation of the function $|w|^\beta$.

The base values $\alpha_{base}(S)$ can be measured once and for all, for each sub-band of coefficients in the wavelet decomposition, from a single psychovisual measurement, and be stored in a table of visual amplitudes.

β is the exponent of a Minkowsky sum and can be chosen equal to 5, for example.

The mathematical expectation $E[|w|^\beta]$ corresponds to an estimation of the mean of the function $|w|^\beta$.

This visibility model does not take into account the image I to be watermarked itself and is independent thereof. This is equivalent to considering that the image I is uniform. It is a question of a "worst case" model since the presence of the image signal makes it possible to visually mask the modulation itself.

In this example, this calculation step E602 is implemented in order to calculate the maximum value $\alpha_v$ of the weighting coefficient α for a length P of the watermarking signal w equal to the cardinal number N of the set of modulatable coefficients X. Thus a maximum value denoted $\alpha_v(N)$ is calculated, which ensures imperceptibility of the watermarking signal w at the limit of perceptibility.

In the example embodiment described here, for a value of β=5, the visual amplitude for the set of coefficients of the sub-band $HH_1$ is given by:

$$\alpha_V(N) = \frac{6^{0.2}\alpha_{HHI}(T)}{N^{0.2}}$$

Next, in a calculation step E603, the length P of the watermarking signal w is calculated for a minimum value $\alpha_D$ of the weighting coefficient α equal to said maximum value $\alpha_V(N)$ calculated and for a predetermined detection probability level.

This is because, in order to meet a predetermined detectability criterion, the weighting coefficient α must be greater than a minimum value $\alpha_D$ referred to as the detection amplitude.

At the decoder, the received image I*, which corresponds to the watermarked initial image, possibly made noisy because of certain distortions applied to the image, is first of all transformed by a transformation identical to that used during the insertion of the watermarking signal in order to find once again the set of coefficients which are modulated.

Thus a set $X^*=\{X_i^*, 1 \leq i \leq N\}$ is obtained, which represents the set of coefficients liable to have been modulated. By hypothesis, it is assumed that any distortion suffered by these coefficients can be modelled by an additive noise, decorrelated from the image signal itself $n=\{n_i, 1 \leq i \leq N\}$.

Each coefficient can thus be written:

$$X_i^* = X_i + \alpha w_i + n_i, \text{ with } 1 \leq i \leq N.$$

The detection of the inserted watermarking signal w consists of constructing a hypothesis test for replying to the question "has the signal w been inserted in X*?".

The advantage of constructing a hypothesis test is that its result makes it possible to give a theoretical confidence level to the decision since a hypothesis test is standardised with respect to known distributions.

For a class of statistical tests based on correlation, it can be shown that this detection amplitude can be calculated from a calculation function of the type:

$$\alpha_D(P) = \frac{a\left(\sqrt{\sigma_X^2 + \sigma_n^2}\right)}{\sqrt{bP - c}}$$

where $\sigma_x^2$ is equal to the variance of the coefficients to be modulated, $\sigma_n^2$ is equal to the variance of the additive noise and a, b and c are constants which depend on the distribution of the watermarking signal w and on the required detection probability level p.

Thus this minimum value $\alpha_D$ is determined according notably to the length P of the watermarking signal w, a detection probability level p, the variance of the coefficients to be modulated, the distribution of the watermarking signal and possibly the variance of an additive noise decorrelated from the coefficients modelling any distortions applied to the coefficients.

Conversely, it is also possible to express the minimum detection length, denoted P°, as a function of the weighting coefficient α, for a fixed detection probability level:

$$P°(\alpha) = \frac{a^2(\sigma_X^2 + \sigma_n^2) + c\alpha^2}{b\alpha^2}$$

It would be possible to use this result to check the parameters which make it possible to insert a watermarking signal w which will be robust to any additive noise with an energy less than or equal to $\sigma_n^2$.

Figure 14:
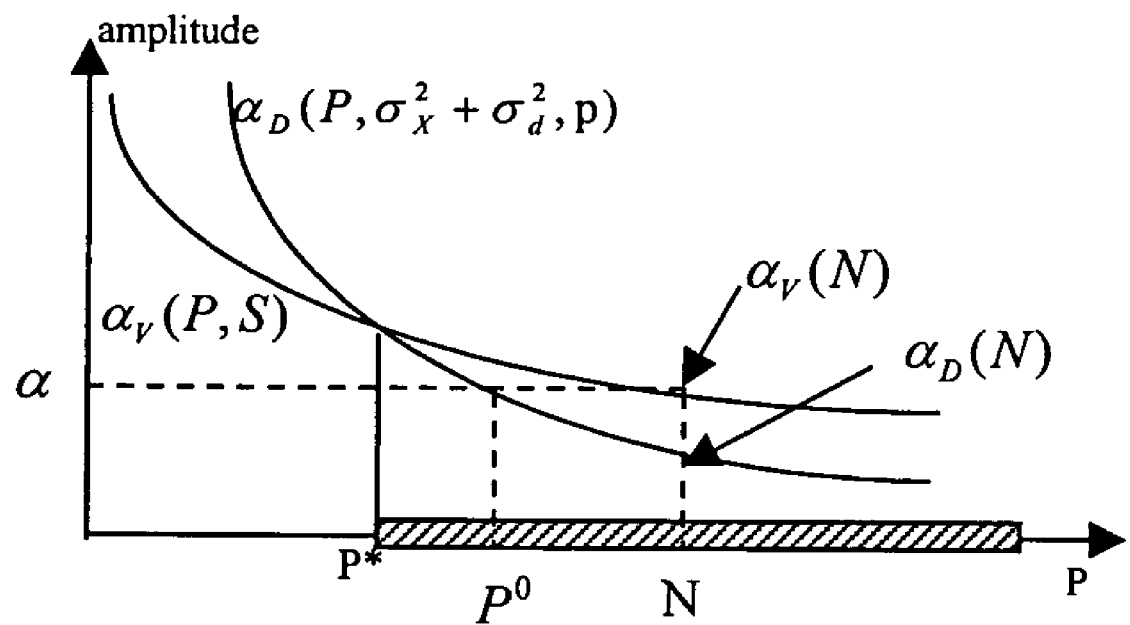
FIG. 14 illustrates, by means of a graph, the insertion method of the FIG. 13.

As illustrated on the curves in FIG. 14, from the visual amplitude xv calculated as a function of the length P of the watermarking signal to be inserted, the insertion method includes, in general terms, a step of determining compatible values of the length P of the watermarking signal w, of the weighting coefficient α and of the probability level p so that the value of the weighting coefficient determined α is less an or equal to the maximum value or visual amplitude $\alpha_V$ and greater than or equal to the minimum value or detection amplitude $\alpha_D$ for these determined values of the length P of the watermarking signal w and the detection probability level p.

The weighting coefficient α, the length P of the watermarking signal w and the detection probability level p must thus be determined so that the following inequality is satisfied:

$$\alpha_D \leq \alpha \leq \alpha_V.$$

As illustrated in FIG. 14, in order to calculate the minimum value P° of the watermarking signal w for which the aforementioned inequality will be satisfied, the formula linking the length P of the watermarking signal w to the amplitude of the weighting coefficient α is used, with $\alpha=\alpha_V(N)$ and with a detection probability level of p %.

In this example a standardised statistical test is taken, based on the correlation between the watermarked signal X* and the inserted watermarking signal w, as proposed for example in the document entitled "On Resolving Rightful Ownerships of Digital Images by Invisible Watermarks" by W. ZENG and B. LIU, in Proc. ICIP 97, pages 552–555, October 1997.

It can be shown that, for this test:

$$\alpha_D = \frac{t_0\sqrt{E(w^2)}\left(\sqrt{\sigma_X^2 + \sigma_n^2}\right)}{\sqrt{E^2(w^2)P - t_0^2\sigma_{w^2}^2}}$$

A calculation step E604 thus makes it possible to calculate the three aforementioned constants a, b and c so that $$a = t_0\sqrt{E(w^2)},$$

$$b = E^2(w^2), \text{ and}$$

$$c = t_0^2\sigma_{w^2}^2.$$

The values $E(w^2)$ and $\sigma_{w^2}^2$ can be calculated theoretically as a function of the distribution of w. For the uniform distribution considered here, the theoretical values are $E(w^2)=\frac{1}{3}$ and $$\sigma_{w^2}^2 = 4/45.$$

The value $t_0$ is a threshold value, dependent on the probability of correct detection p: $t_0 = 2 \times t_p$. The values of $t_p$ are percentile of a centred Gaussian law and have a variance equal to 1. These values are tabulated in the state of the art, for example in the book entitled "Probability and Statistics" by A. PAPOULIS, Prentice-Hall, 1990.

For example, $t_p=3,291$ corresponds to p=0,9995, that is to say to a detection probability level equal to 99,95%.

In this numerical example it is considered that any additive noise is not taken into account so that $\sigma_n=0$.

In an estimation step E605, the variance of the set of coefficients X is also estimated. The variance is estimated according to the following formula:

$$\sigma_X^2 = \frac{1}{N-1}\sum_{i=1}^{N}(X_i - M_X)^2 \text{ with } M_X = \frac{1}{N}\sum_{i=1}^{N}X_i$$

Then, for a detection probability fixed at 99.95%, the function linking the length P of the watermarking signal w to be inserted and the weighting coefficient $\alpha$ is then derived therefrom:

$$P = \frac{14,44 \times \sigma_X^2 + 3,84\alpha^2}{0,11\alpha^2}$$

At the calculation step E603, the minimum length P° is determined from the above formula for a weighting coefficient equal to the maximum value $\alpha_v(N)$ calculated at the calculation step E602.

The insertion method includes, in this example embodiment, a step E606 of comparing this calculated length P° with the cardinal number N of the set of modulatable coefficients X.

If, at this comparison step E606, the calculated length P° is less than or equal to the cardinal number N of the set of modulatable coefficients X, it is deduced therefrom that the insertion of a watermarking signal w of length P° is possible and meets the required imperceptibility and detection criteria.

In reality, it is possible to effect an insertion of a watermarking signal w which meets these criteria since the length P of this watermarking signal lies between the calculated value P° and the cardinal number N of the set of modulatable coefficients X.

Then the insertion proper of a watermarking signal of length P is carried out by modulating a subset of coefficients with a cardinal number P according to the linear modulation level, with a weighting coefficient $\alpha$ equal to the calculated maximum value $\alpha_v(N)$.

The insertion method includes, in the usual fashion, a reverse spatio-frequency transformation step which makes it possible to obtain, at the output of the coder, the watermarked image I*.

Where insertion is possible, it is also possible to calculate the number of theoretical bits which can be inserted. This is because, at the decoder, the decoding operation consists of detecting whether a pseudo-random sequence w has been inserted. The response being binary (yes/no), it can be considered that a pseudo-random sequence of length P makes it possible to insert and extract an information bit in the image. By repeating the insertion operation on several subsets of spectral coefficients, it is possible to insert and extract several information bits.

Consequently, since in this example there are a set of coefficients of cardinal number N and since only a number P° of coefficients are necessary to insert and detect an information bit, it is possible to derive therefrom the total number Q of information bits which can be inserted, referred to as the capacity of the image: Q=N/P°.

Moreover, if at the comparison step E606 the calculated length P° is greater than the cardinal number N of the set of modulatable coefficients X, it is a priori deduced therefrom that the insertion of a watermarking signal meeting the criteria of imperceptibility and detectability is not possible.

In this case, the insertion method can if necessary include an additional step of calculating the detection probability level p' obtained for a minimum value $\alpha_D$ of the weighting coefficient equal to the maximum value $\alpha_v(N)$ calculated for a length P of the watermarking signal w equal to the cardinal number N of the set of modulatable coefficients X.

If this detection probability level, which will be less than that fixed initially at 99.95%, is judged satisfactory, the insertion of a watermarking signal of length equal to N can be effected, that is to say all the coefficients of the sub-band of frequency $HH_1$ are modulated.

In a second embodiment of the invention, the insertion method can include a step of calculating a threshold value P* of the length of the watermarking signal w, as illustrated in FIG. 14.

This threshold value P* is determined so that the minimum value $\alpha_D$ of the weighting coefficient is equal to the maximum value $\alpha_v$ of the weighting coefficient for a length P of the watermarking signal w equal to this threshold value P* and a predetermined detection probability level p.

This calculation step makes it possible to determine, from formulae expressing the detection amplitude $\alpha_D$ and the visual amplitude $\alpha_v$ notably as a function of the length P of the watermarking signal w, the minimum value P* of the insertion signal from which the weighting coefficient $\alpha$ can satisfy the inequality $\alpha_D \leq \alpha \leq \alpha_v$.

In FIG. 14, this minimum value P* is given by the intersection of the two curves representing the variation in the visual amplitude $\alpha_v$ and the variation in the detection amplitude as a function of the length P of the inserted watermarking signal w, for a predetermined detection probability level.

Thus, in general terms, the insertion method according to the invention has the advantage of being able to control a priori and theoretically the detection probability and imperceptibility of the watermarking signal which it is sought to insert in an image.

Naturally, many modifications could be made to the example embodiments described above without departing from the scope of the invention.

Thus the insertion technique used could be applied to the raw digital image, without undergoing any spatio-frequency transformation prior to the modulation of the coefficients.

In this case, the modulated coefficients are coefficients representing the digital image solely in the spatial domain.

Moreover, the spatio-frequency transformation applied to the image can use analysis and synthesis filters other than those described above, or even be a transformation other than discrete Fourier transformation, discrete cosine transformation or Fourier-Mellin transformation. These transformations are used currently in conventional processings of digital images.

In addition, the invention is not limited to the example embodiments described but also concerns any embodiment where the values of the weighting coefficient $\alpha$, of the length P of the watermarking signal and of the detection probability level p are determined in a correlated fashion so as to satisfy the inequality $\alpha_D \leq \alpha \leq \alpha_v$.

The present invention also concerns a device for determining a partitioning and a decoding device which are adapted to implement the partitioning and decoding methods described previously.

Figure 15:
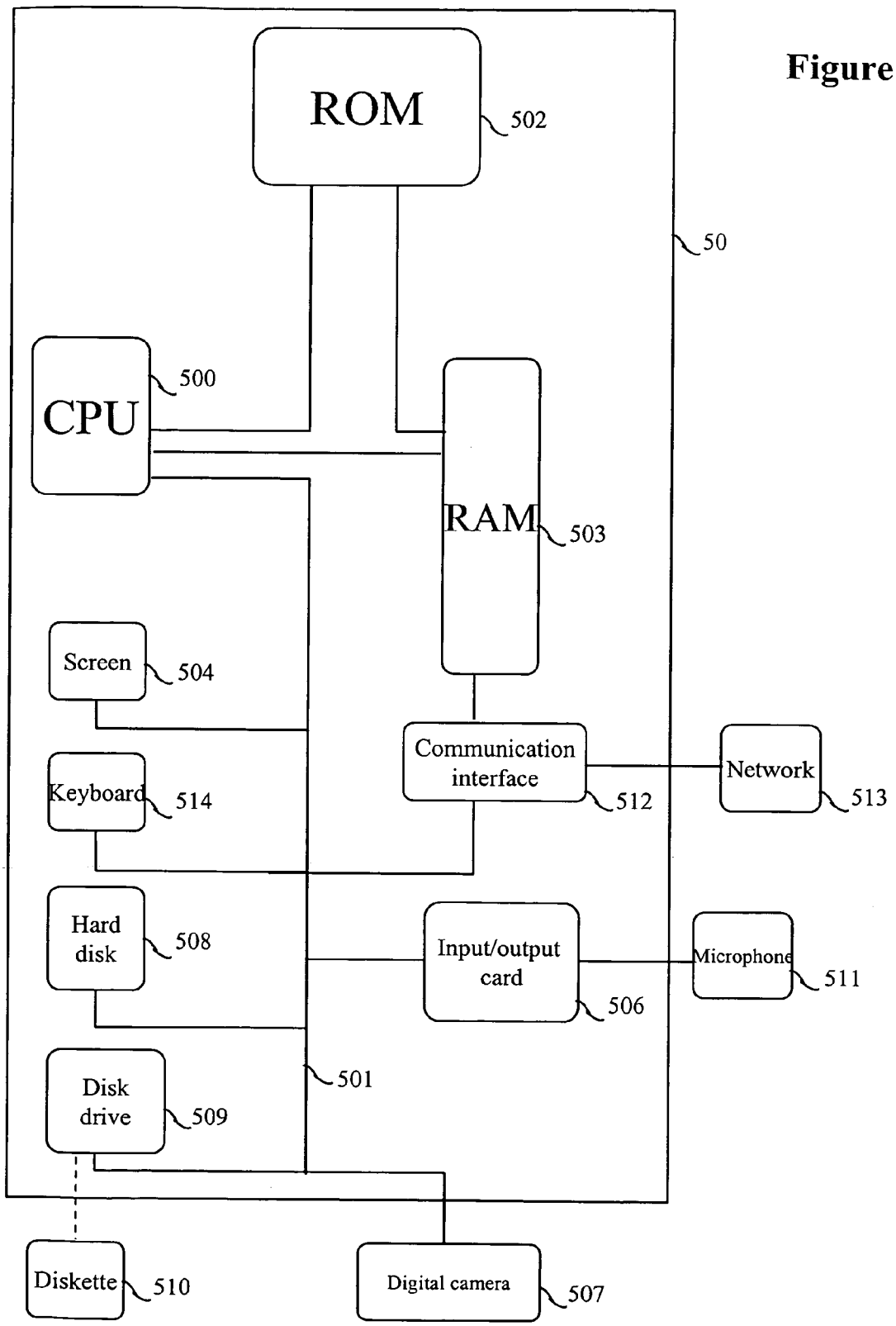
FIG. 15 is a block diagram illustrating a device adapted to implement the methods in accordance with the invention.

These devices for determining a partitioning and decoding can be used in a computer 50 as illustrated in FIG. 15, independently or in the same computer 50.

The partitioning determination device comprises partitioning means 500, 502, 503 adapted to perform an adaptive partitioning according to a criterion of detectability of an information bit inserted on each region.

These partitioning means use on coding a maximum value $\alpha_v$ of the weighting coefficient ensuring imperceptibility of the watermarking signal for modulating all the coefficients representing said digital image, possibly with a modulation factor $k_i$ dependent on each coefficient, as described previously.

This device for determining a partitioning also has means 500, 502, 503 of comparing the size P of each region of the partitioning with a minimum size $P_{stat}$ corresponding to minimum size of a statistically significant sample for the detection of a watermarking signal inserted in said region.

The device also has means 500, 502, 503 for applying a pre-distortion before calculating a detectability criterion.

The partitioning means comprise means 500, 502, 503 of modulating all the coefficients of each region by inserting the watermarking signal, means 500, 502, 503 of calculating a detectability amplitude from the detectability criterion and means 500, 502, 503 of validating the detectability criterion, adapted to compare the detectability amplitude with a predetermined threshold value Tc.

The partitioning means 500, 502, 503 are adapted to effect a partitioning by iterative division of the numerical image and, for each region at a rank in the said partitioning, the validation means 500, 502, 503 are adapted to validate a partitioning of a rank higher in the region if and only if there exist at least two subregions of the region for which the detectability criterion is validated.

This device also comprises means 500, 502, 503 of incrementing the value of a capacity Q of the digital image, adapted, for each region at a rank in the partitioning, to increment the capacity value Q when the partitioning of rank directly higher is not validated, the capacity Q being equal to the cardinal number of the distinct regions obtained by the partitioning on which the detectability criterion is validated.

In another embodiment, this device for determining a partitioning comprises incrementation means 500, 502, 503 adapted, for each region R at a rank in the partitioning, to increment the value of a capacity Q when the partitioning of rank directly higher is not validated, comparison means 500, 502, 503 adapted to compare the value of the capacity Q with a fixed capacity value Qs and reiteration means 500, 502, 503 adapted to reiterate the partitioning for a region having the highest detectability amongst all the other regions to be processed when the capacity value Q is less than the fixed capacity value Qs.

In a third embodiment of the invention, the partitioning means 500, 502, 503 are adapted to effect a partitioning by iterative merging of the digital image and there are adapted, for each region of the partitioning for which the detectability criterion is not validated, to merge the region with another region of the partitioning, and preferably with another region of the partitioning for which the detectability criterion is not validated.

In an entirely similar fashion, the device for decoding a watermarking signal in a digital image comprises means 500, 502, 503 of partitioning the digital image to be decoded into distinct regions, adapted to perform an adaptive partitioning as a function of a criterion of detectability of an information bit obtained by demodulating the coefficients on each region.

It also has means 500, 502, 503 of comparing the size P of each region R of the partitioning with a minimum size $P_{stat}$ corresponding to the minimum size of a statistically significant sample for the detection of a watermarking signal inserted in the region.

It comprises means 500, 502, 503 of calculating a detection amplitude from the detectability criterion and means 500, 502, 503 of validating the detectability criterion, adapted to compare the detection amplitude with a predetermined threshold value Td for decoding.

This predetermined threshold value Td for decoding is less than the predetermined threshold value Tc used during the partitioning determination method described previously.

In a preferred embodiment, the device for determining a partition includes means 500, 502, 503 for checking a criterion of detectability, over each region, of an information bit inserted by means of a pseudo-random sequence with average of zero by modulation of the coefficients of the region.

It also includes means 500, 502, 503 for generating a centred pseudo-random sequence equal in size to the cardinal number of the set of coefficients representative of an image, here equal to N.

Means 500, 502, 503 of modulating the set of coefficients X by the centred pseudo-random sequence in order to insert the same information bit onto this set of coefficients are also incorporated into the device for determining a partition 11 as shown on FIG. 1.

The latter may also includes means 500, 502, 503 for applying a distortion D which makes it possible to provide for and guarantee the robustness of the inserted watermark in the case of certain types of distortion, typically a compression of the digital image in order to store it.

These means of applying a distortion make it possible actually to simulate a predetermined distortion over the set of modulated coefficients. Here they comprise, whenever the coefficients of the set X are spectral coefficients, means 500, 502, 503 for inverse spectral transformation of the set of coefficients modulated in order to obtain a watermarked image, means 500, 502, 503 for applying a distortion to this watermarked image, and means 500, 502, 503 for spectral transformation of the watermarked image in order to recover the set of modulated coefficients after distortion.

In this example, the inverse-spectral-transformation means are suitable for implementing multi-resolution spectral wavelet recomposition and the forward spectral transformation means are suitable for again reiterating the breakdown of the digital image I into wavelets.

The device for determining a partition 11, in a first way, also includes means for partitioning by iterative combination, on the basis of an initial segmentation of the set of coefficients X.

For preference, this initial segmentation makes it possible to segment the set of coefficients X into a set of regions of a size which is statistically significant for validating the detectability criterion over these regions.

The means of partitioning 500, 502, 503 by iterative combination are suitable, for each region of the partition for which the detectability criterion is not satisfied, for combining the region with another region of the partition.

Obviously, the partitioning means 500, 502, 503 could also be suitable for forming this partition of the image by iterative division of the digital image according to a second way of performing the preferred embodiment of the invention.

This partition-determining device 11 makes it possible, as output, to obtain a partition into regions of the set of coefficients X, with it being possible to insert an information bit onto each of these regions with a reliable detection probability and robustness to a given distortion. The maximum number of regions which can be obtained by this adaptive partitioning of the set X corresponds to the practical insertion capacity of this set X.

As illustrated in FIG. 1, an insertion device 10, incorporating the device for determining a partition 11 described above, moreover comprises means 13 for reading a watermark to be inserted, containing several information bits. By way of an example which is not at all limiting, a binary watermark may be 1000111, representing, for example, the coding of the name of the author of the image to be watermarked.

The insertion means 12 proper may be conventional and make it possible, by modulation, to insert the various information bits of the watermark onto the various insertion carriers determined by the device for determining a partition 11.

According to the invention, the device for inserting a watermarking signal w comprises means 500, 502, 503 of spatio-frequency transformation of an image I, and for example analysis filters associated with decimators by two adapted to effect a wavelet decomposition of an image I. It also has reverse spatio-frequency recomposition means 500, 502, 503 for recomposing the image I after the insertion of the watermarking signal in the domain transformed into sub-bands.

It also comprises means 500, 502, 503 of inserting a watermarking signal w of length P adapted to modulate a subset of coefficients of cardinal number P according to the linear model described previously using a weighting coefficient $\alpha$.

This insertion device also comprises means 500, 502, 503 of calculating the maximum value $\alpha_v$ of the weighting coefficient as a function of the length P of the watermarking signal w ensuring imperceptibility of the watermarking signal. These calculation means use the function $\alpha_v(P, T)$ described above and dependent on the length P of the watermarking signal w and the spectral transformation T used for decomposing the image signal I.

In general terms, this insertion device also has means 500, 502, 503 of determining compatible values of the length P of the watermarking signal w, the weighting coefficient $\alpha$ and the probability level p so that the value of the weighting coefficient determined is less than or equal to the maximum value $\alpha_v$ and greater than or equal to the minimum value $\alpha_D$ for the determined values of the length P of the watermarking signal w and the detection probability level p.

The calculation means 500, 502, 503 are also adapted to determine a minimum value or detection amplitude $\alpha_D$ using the calculation functioning described above of the type:

$$\alpha_D(P) = \frac{a\left(\sqrt{\sigma_X^2 + \sigma_n^2}\right)}{\sqrt{bP - c}}$$

In one embodiment of the invention, the insertion device also has means of calculating 500, 502, 503 the length P° of the watermarking signal w for a minimum value $\alpha_D$ of the weighting coefficient equal to a maximum value $\alpha_v(N)$ calculated for a length P of the watermarking signals w equal to the cardinal number N of the set of modulatable coefficients ensuring imperceptibility of the watermarking signal w at the limit of perceptibility and for a predetermined detection probability level p; and means 500, 502, 503 of comparing this length P° calculated with the cardinal number N of the set of modulatable coefficients X.

It also comprises means 500, 502, 503 of calculating a detection probability level p' obtained for a minimum value $\alpha_D$ of the weighting coefficient equal to the maximum value $\alpha_v$ calculated for a length P of the watermarking signal equal to the cardinal number N of the set of modulatable coefficients X.

In another embodiment, the insertion device comprises means 500, 502, 503 of calculating a threshold value P* of the length of the watermarking signal w determined so that the minimum value $\alpha_D$ of the weighting coefficient is equal to the maximum value $\alpha_v$ of the weighting coefficient of the length P of the watermarking signal w equal to this threshold value P* and a predetermined detection probability level p.

All the previously described devices are incorporated in a microprocessor 500 of the computer 50, a read-only memory 502 being adapted to store a program for determining a partitioning and/or inserting a watermarking signal and/or decoding the watermarking signal and a random access memory 503 comprising registers adapted to store variables modified during the running of the programs.

The microprocessor 500 is integrated into the computer 50, which can be connected to different peripherals, for example a digital camera 507 or a microphone 511, by means of an input/output card 506 in order to receive and store documents.

The digital camera 507 makes it possible notably to supply images to be authenticated by inserting a watermarking signal.

This computer 50 has a communication interface 512 connected to a communication network 513 in order to receive, if necessary, images to be watermarked.

The computer 50 also has document storage means, such as a hard disk 508, or is adapted to cooperate, by means of a disk drive 509, with removable document storage means such as diskettes 510.

These fixed or removable storage means can also contain the code of the different methods according to the invention which, once read by the microprocessor 500, will be stored on the hard disk 508.

By way of variant, the program enabling the devices to implement the invention can be stored in the read only memory 502.

As a second variant, the program can be received in order to be stored as described above by means of the communication network 513.

The computer 50 also has a screen 504 for serving, for example, as an interface with an operator by means of the keyboard 514 or any other means.

The central unit 500 (CPU) will execute the instructions relating to the implementation of the invention. On powering up, the programs and methods relating to the invention stored with a non-volatile memory, for example the read only memory 502, are transferred into the random access memory 503 (RAM) which will then contain the executable code of the invention and the variables necessary for implementing the invention.

This random access memory 503 contains different registers for storing the variables necessary for the running of the program, and notably a register for storing the coefficients of the regions R which are temporarily modulated or demodulated in order to verify the detectability criterion, the minimum value $P_{stat}$, and the threshold value Tc and Td respectively on coding and decoding.

This random-access memory 503 also includes an $X_i$, $X_j$ register for storing the coefficients of the regions which are modulated or demodulated temporarily so as to check the detectability criterion and a register w for storing the centred pseudo-random sequence generated in order to determine the partition of the set X.

Finally, the random access memory 503 contains a register for storing the table of visual amplitudes of $\alpha_{base}(T)$, a register for storing the spectral coefficients X, a register for calculating the visual amplitude $\alpha_v(N)$ at the limit of imperceptibility, a register for storing the values of the constants a, b, c and of the variance $\sigma_x^2$ necessary for determining the detection amplitude $\alpha_D$ as a function of the length P of the watermarking signal w and a register for storing the minimum value P° calculated.

A communication bus 501 affords communication between the different sub-elements of the computer 50 or linked to it. The representation of the bus 501 is not limitative and notably the microprocessor 500 is able to indicate instructions to any sub-element directly or by means of another sub-element.

The invention claimed is:

1. Method of inserting, into a digital image, a watermarking signal (W) by modulating coefficients (X) of distinct spatial regions (R) representing said digital image (I), comprising a step of determining a partitioning into distinct spatial regions of the digital image, characterised in that the partitioning into regions is effected by adaptively selecting for each information bit, a subset of coefficients forming a region to be modulated as a function of criterion of statistical detectability of the information bit inserted in the region.

2. Method of inserting a watermark according to claim 1, characterised in that the detectability criterion is calculated by using a maximum value ($\alpha_v$) of the weighting coefficient ensuring imperceptibility of the watermarking signal for modulating all the coefficients representing said digital image.

3. Method of inserting a watermark according to claim 2, characterised in that a maximum value ($\alpha_v$) can be calculated by:

$$\alpha_v(P, S, w) = \frac{\alpha_{base}(S)}{P^{1/\beta}(E[|w|^\beta])^{1/\beta}}$$

where $\alpha_{base}(S)$ is a base value, dependent on the transformation used S and on the (base) sub-band considered for the insertion, of the maximum weighting coefficient ensuring imperceptibility when a single coefficient of said sub-band is modulated, β is strictly greater than 2, and $E[|w|^\beta]$ is the mathematical expectation of the function $|w|^\beta$.

4. Method of inserting a watermark according to one of claim 2 or 3, characterised in that the detectability criterion is calculated by using, for each coefficient ($X_i$) to be modulated, a weighting coefficient in accordance with a law of the form $\alpha_i = k_i \cdot \alpha_v$, where $k_i$ is a modulation factor dependent on the coefficients situated close to the relevant coefficient ($X_i$) on said region and $\alpha_v$ is equal to said maximum value of the weighting coefficient.

5. Method of inserting a watermark according to one of claims 1 to 3, characterised in that it comprises a step of applying a distortion before calculating the detectability criterion.

6. Method of inserting a watermark according to one of claims 1 to 3, characterised in that it includes a prior step of comparing the size (P) of each region (R) of the partitioning with a minimum size ($P_{stat}$) corresponding to the minimum size with a statistically significant sample for the detection of a watermarking signal inserted in said region.

7. Method of inserting a watermark according to one of claim 1 to 3, characterised in that, for each region (R) of the partitioning, all the coefficients of said region are modulated by inserting the watermarking signal (W), a detectability amplitude (T) is calculated from said detectability criterion and said detectability criterion is validated by comparing said detectability amplitude (T) with a predetermined threshold value (Tc).

8. Method of inserting a watermark according to claim 7, characterised in that said detectability criterion is validated if a minimum modulation length ($P_{min}(x)$) calculated for ensuring detectability of the inserted watermarking signal (W) is less than or equal to the cardinal number of said region (R).

9. Method of inserting a watermark according to claim 7, characterised in that a partitioning by iterative division of the digital image is effected and in that, for each region at a rank of said partitioning, a partitioning of a directly higher rank of said region is validated if and only if there exist at least two sub-regions of said region for which said detectability criterion is validated.

10. Method of inserting a watermark according to claim 9, characterised in that, for each region at a rank of said partitioning, the value of a capacity (Q) of the digital image is incremented when the partitioning of directly higher rank is not validated, said capacity (Q) being equal to the cardinal number of the distinct regions obtained by said partitioning on which the detectability criterion is validated.

11. Method of inserting a watermark according to claim 7, characterised in that a partitioning by iterative merging of the digital image is effected and in that, for each region of said partitioning for which said detectability criterion is not validated, said region is merged with another region of said partitioning.

12. Method of inserting a watermark according to claim 11, characterised in that said other region of the partitioning is if possible a region for which said detectability criterion is not validated.

13. Computer, characterised in that it comprises means adapted to implement an inserting method according to one of claim 1 to 3.

14. Digital image processing apparatus, characterised in that it comprises means adapted to implement an inserting method according to one of claim 1 to 3.

15. Digital printer, characterised in that it comprises means adapted to implement an inserting method according to one of claim 1 to 3.

16. Digital photographic apparatus, characterised in that it comprises means adapted to implement an inserting method according to one of claim 1 to 3.

17. Digital camera, characterised in that it comprises means adapted to implement an inserting method according to one of claim 1 to 3.

18. Computer program product, characterised in that it is adapted to implement an inserting method according to one of claim 1 to 3.

19. Information storage means readable by a microprocessor, characterised in that it stores a program implementing inserting method according to one of claim 1 to 3.

20. Method of decoding a watermarking signal in a digital image, inserted by modulating coefficients (X) representing said image in distinct spatial regions forming a partitioning of said digital image, characterised in that a partitioning into distinct spatial regions of the digital image to be decoded is effected by adaptively selecting for each information bit, a subset of coefficients forming a region to be demodulated as a function of a criterion of statistical detectability of the information bit obtained by demodulating coefficients of the region.

21. Decoding method according to claim 20, characterised in that it includes a prior step of comparing the size (P) of each region of the partitioning with a minimum size ($P_{stat}$) corresponding to the minimum size of a statistically significant sample for the detection of a watermarking signal inserted in said region.

22. Decoding method according to one of claim 20 or 21, characterised in that, for each region (R) of the partitioning, a detection amplitude (T) is calculated from said detectability criterion and said detectability criterion is validated by comparing said detection amplitude (T) with a predetermined threshold value (Td) for decoding.

23. Decoding method according to claim 22, characterised in that the predetermined threshold value (Td) for decoding is less than said predetermined threshold value (Tc) used during the partitioning determination method according to claim 7.

24. Computer, characterised in that it comprises means adapted to implement the decoding method according to one of claim 20 or 21.

25. Digital image processing apparatus, characterised in that it comprises means adapted to implement the decoding method according to one of claim 20 to 21.

26. Digital printer, characterised in that it comprises means adapted to implement the decoding method according to one of claim 20 to 21.

27. Digital photographic apparatus, characterised in that it comprises means adapted to implement the decoding method according to one of claim 20 to 21.

28. Digital camera, characterised in that it comprises means adapted to implement the decoding method according to one of claim 20 to 21.

29. Computer program product, characterised in that it is adapted to implement a decoding method according to one of claim 20 to 21.

30. Information storage means readable by a microprocessor, characterised in that it stores a program implementing a decoding method according to one of claim 20 to 21.

31. Device for inserting, into a digital image, a watermarking signal (W) by modulating coefficients (X) of distinct spatial regions (R) representing the digital image (I), characterised in that it comprises partitioning means adapted to adaptively select for each information bit, a subset of coefficients forming regions to be modulated as a function of a criterion of statistical detectability of the information bit inserted in the region.

32. Inserting device according to claim 31, characterised in that it also includes means for applying a distortion before calculating the detectability criterion.

33. Inserting device according to one of claim 31 to 32, characterised in that it also has means of comparing the size of each region of the partitioning with a minimum size corresponding to the minimum size of a statistically significant sample for the detection of a watermarking signal inserted in the said region.

34. Partitioning determination device according to one of claim 31 to 32, characterised in that the partitioning means comprise means of modulating all the coefficients of each region by inserting the watermarking signal, means of calculating a detectability amplitude from said detectability criterion and means of validating said detectability criterion, adapted to compare said delectability amplitude with a predetermined threshold value.

35. Partitioning determination device according to claim 34, characterised in that the partitioning means are adapted to effect a partitioning by iterative division of the digital image and in that, for each region at a rank of said partitioning, the validation means are adapted to validate a partitioning of a directly higher rank of said region if and only if there exist at least two sub-regions of said regions for which said detectability criterion is validated.

36. Partitioning determination device according to claim 35, characterised in that it also comprises means of incrementing the value of a capacity of the digital image adapted, for each region at a rank of said partitioning, to increment the said capacity value when the partitioning of directly higher rank is not validated, said capacity being equal to the cardinal number of the distinct regions obtained by said partitioning on which the detectability criterion is validated.

37. Partitioning determination device according to claim 34, characterised in that the partitioning means are adapted to effect a partitioning by iterative merging of the digital image and are adapted, for each region of said partitioning for which said detectability criterion is not validated, to merge said region with another region of said partitioning.

38. Partitioning determination device according to claim 37, characterised in that said other region of the partitioning is if possible a region for which said detectability criterion is not validated.

39. Partitioning determination device according to one of claim 31 to 32, characterised in that it is incorporated in a microprocessor, a read only memory being adapted to store a program for determining a partitioning and a random access memory comprising registers adapted to store variables modified during the running of said program.

40. Device for decoding a watermarking signal in a digital image, inserted by modulation of coefficients representing said image in distinct spatial regions forming a partitioning of said digital image, characterised in that it comprises means for partitioning the digital image to be decoded into distinctive spatial regions, adapted to adaptively select for each information bit, a subset of coefficients forming regions to be demodulated bit as a function of a criterion of statistical detectability of the information bit obtained by demodulating coefficients of the regions.

41. Decoding device according to claim 40, characterised in that it also has means of comparing the size of each region of the partitioning with a minimum size corresponding to the minimum size of a statistical significant sample for the detection of a watermarking signal inserted in said region.

42. Decoding device according to one of claim 40 or 41, characterised in that it comprises means of calculating a detection amplitude from said detectability criterion and means of validating said detectability criterion adapted to compare said detection amplitude with a threshold value predetermined for the decoding.

43. Decoding device for decoding a watermarking signal in a digital image according to claim 41, characterized in that the predetermined threshold value for the decoding is less than a predetermined threshold value (Tc) used during a partitioning determination method that comprises a step of determining a partitioning of the digital image into distinct spatial regions by adaptively selecting, for each information bit of the watermarking signal, a subset of coefficients forming a region to be modulated as a function of criterion of statistical detectability of the information bit inserted in the region, wherein for each region (R) of the partitioning, all the coefficients of the region are modulated by inserting the watermark signal, a detectability amplitude (T) is calculated from the detectability criterion, and the detectability criterion is validated by comparing the dtectability amplitude (T) with the predetermined threshold value (Tc).

44. Decoding device according to one of claim 40 to 41, characterised in that it is incorporated in a microprocessor, a read only memory being adapted to store a program for decoding a watermarking signal and a random access memory comprising registers adapted to store variables modified during the running of said program.

45. Method of inserting, into a digital image, a watermarking signal (W) by modulating coefficients (X) of distinct spatial regions (R) representing said digital image (I), comprising a step of determining a partitioning into distinct spatial regions of the digital image, wherein the partitioning into regions is effected by selecting, for each information bit, a subset of coefficients forming a region to be modulated, the size of said region being a function of criterion of statistical detectability of the information bit inserted into the region.

46. Method of inserting, into a digital image, a watermarking signal (W) by modulating coefficients (X) of distinct spatial regions (R) representing said digital image (I), comprising a step of determining a partitioning into distinct spatial regions of the digital image, wherein the partitioning into regions is effected by selecting, for each information bit, a subset of coefficients forming a region to be modulated, the size of said region depending on a given detection probability of the information bit inserted in the region.

* * * * *

UNITED STATES PATENT AND TRADEMARK OFFICE
CERTIFICATE OF CORRECTION

PATENT NO. : 7,031,491 B1
APPLICATION NO. : 09/544159
DATED : April 18, 2006
INVENTOR(S) : Ioanna Donescu et al.

It is certified that error appears in the above-identified patent and that said Letters Patent is hereby corrected as shown below:

COLUMN 1
Line 24, "principe," should read --principle,--.

COLUMN 2
Line 10, "describe for example" should read --described, for example,--.
Line 12, "et al," should read --et al.,--.
Line 15, "et al," should read --et al.,--.

COLUMN 5
Line 50, "better to" should read --to better--.

COLUMN 7
Line 16, "been-per-" should read --been per- --.
Line 45, "been" should read --that has been--.

COLUMN 8
Line 66, "watermarking-signal" should read --watermarking signal--.

COLUMN 13
Line 67, "level" should read --levels--.

COLUMN 14
Line 35, "is" should read --is:--.

COLUMN 21
Line 18, "is" should read --is,--, and "possible" should read --possible,--.

COLUMN 23
Line 25, "usual-fashion" should read --usual fashion--.

COLUMN 25
Line 8, "predefined-distribution-" should read --predefined distribution--.
Line 15, "centring" should read --centering--.

COLUMN 29
Line 24, "as" should read --as a--.

COLUMN 32
Line 13, "et al," should read --et al.,--.
Line 15, "1164-1175," should read --pp. 1164-1175,--.

UNITED STATES PATENT AND TRADEMARK OFFICE
CERTIFICATE OF CORRECTION

PATENT NO. : 7,031,491 B1
APPLICATION NO. : 09/544159
DATED : April 18, 2006
INVENTOR(S) : Ioanna Donescu et al.

It is certified that error appears in the above-identified patent and that said Letters Patent is hereby corrected as shown below:

COLUMN 34
Line 6, "xv" should read --αv--.

COLUMN 35
Line 1, "percentile" should read --a percentile--.

COLUMN 38
Line 22, "average" should read --an average--.
Line 33, "includes" should read --include--.

COLUMN 39
Line 66, "the length" should read --of the length--.

COLUMN 42
Line 47, "is" should read --is,-- and "possible" should read --possible,--.
Line 51, "claim" should read --claims--.
Line 54, "claim" should read --claims--.
Line 57, "claim" should read --claims--.
Line 60, "claim" should read --claims--.
Line 63, "claim" should read --claims--.
Line 67, "claim" should read --claims--.

COLUMN 43
Line 3, "inserting" should read --an inserting-- and "claim" should read --claims--.
Line 20, "claim" should read --claims--.
Line 33, "claim" should read --claims--.
Line 36, "claim" should read --claims--.
Line 40, "claim" should read --claims--.
Line 43, "claim" should read --claims--.
Line 46, "claim" should read --claims--.
Line 49, "claim" should read --claims--.
Line 52, "claim" should read --claims--.
Line 65, "claim" should read --claims--.

UNITED STATES PATENT AND TRADEMARK OFFICE
CERTIFICATE OF CORRECTION

PATENT NO. : 7,031,491 B1
APPLICATION NO. : 09/544159
DATED : April 18, 2006
INVENTOR(S) : Ioanna Donescu et al.

It is certified that error appears in the above-identified patent and that said Letters Patent is hereby corrected as shown below:

COLUMN 44
Line 5, "claim" should read --claims--.
Line 36, "is" should read --is,-- and "possible" should read --possible,--.
Line 39, "claim" should read --claims--.
Line 51, "bit" should be deleted.
Line 59, "claim" should read --claims--.
Line 67, "41," should read --42,--.

COLUMN 45
Line 13, "dtectability" should read --detectability--.
Line 15, "claim" should read --claims--.

Signed and Sealed this

Twenty-eighth Day of November, 2006

JON W. DUDAS
*Director of the United States Patent and Trademark Office*